(12) United States Patent
Nakamura

(10) Patent No.: US 9,928,396 B2
(45) Date of Patent: Mar. 27, 2018

(54) SYMBOL INFORMATION READER AND SYMBOL INFORMATION READING METHOD

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION, Suwa-gun, Nagano (JP)

( * ) Notice: Subject to any disclaimer, the term of this patent is extended or adjusted under 35 U.S.C. 154(b) by 14 days.

(21) Appl. No.: 15/086,812

(22) Filed: Mar. 31, 2016

(65) Prior Publication Data

US 2016/0292483 A1    Oct. 6, 2016

(30) Foreign Application Priority Data

Mar. 31, 2015 (JP) ................................. 2015-074206

(51) Int. Cl.
*G06K 7/10* (2006.01)
*G06K 7/14* (2006.01)

(52) U.S. Cl.
CPC ......... *G06K 7/1443* (2013.01); *G06K 7/1413* (2013.01)

(58) Field of Classification Search
CPC ...... G06K 7/14; G06K 7/1404; G06K 7/1413; G06K 7/1443

USPC ............ 235/462.08, 462.01, 462.09, 462.12
See application file for complete search history.

(56) References Cited

U.S. PATENT DOCUMENTS

| | | | | | |
|---|---|---|---|---|---|
| 5,468,945 | A | * | 11/1995 | Huggett et al. | 235/462.02 |
| 5,512,739 | A | * | 4/1996 | Chandler et al. | 235/462.09 |
| 5,979,768 | A | * | 11/1999 | Koenck | 235/470 |
| 6,176,428 | B1 | * | 1/2001 | Joseph et al. | 235/462.1 |
| 6,293,466 | B1 | * | 9/2001 | Fujita et al. | 235/462.02 |

FOREIGN PATENT DOCUMENTS

JP    2009266190 A    11/2009

\* cited by examiner

*Primary Examiner* — Daniel St Cyr
(74) *Attorney, Agent, or Firm* — Cantor Colburn LLP

(57) ABSTRACT

A symbol information reader may include an imager; an image memory configured to save image data of a recording medium; and a position detecting processor configured to retrieve the image data and detect the positions of symbols on the recording medium. The position detecting processor may be configured to calculate the amount of change in luminance value of scanning lines in a predetermined area of the image data and discriminate a provisional area possibly corresponding to the symbol, acquire correlations of the provisional area with neighboring areas and create a map showing an area with high correlation values, search the correlation map for the presence of the symbols and label on areas judged having the symbols, set an area for each of the multiple symbols and makes divisions, and detect positions of the symbols printed on the recording medium.

6 Claims, 15 Drawing Sheets

FIG. 8

| | X1 | | | Z11 | | | | |
|---|---|---|---|---|---|---|---|---|
| | 0 | 0 | 0 | 0 | 0 | 0 | 0 | 0 |
| | 1 | 1 | 1 | 1 | 1 | 0 | 0 | 0 |
| | 1 | 1 | 1 | 1 | 1 | 0 | 0 | 0 |
| | 1 | 1 | 1 | 1 | 1 | 0 | 0 | 0 |
| | 1 | 1 | 1 | 1 | 1 | 0 | 0 | 0 |
| | 0 | 0 | 0 | 0 | 0 | 0 | 0 | 0 |
| | 0 | 0 | 0 | 0 | 1 | 1 | 1 | 0 |
| | 0 | 0 | 0 | 0 | 1 | 1 | 1 | 0 |
| | 0 | 0 | 0 | 0 | 1 | 1 | 1 | 0 |
| | 0 | 0 | 0 | 0 | 0 | 0 | 0 | 0 |
| | 0 | 0 | 0 | 0 | 0 | 0 | 0 | 0 |

| | | Z12 | | | | | |
|---|---|---|---|---|---|---|---|
| 0 | 0 | 0 | 0 | 0 | 0 | 0 | 0 |
| 1 | 1 | 1 | 1 | 1 | 0 | 0 | 0 |
| 2 | 2 | 2 | 2 | 2 | 0 | 0 | 0 |
| 2 | 2 | 2 | 2 | 2 | 0 | 0 | 0 |
| 1 | 1 | 1 | 1 | 1 | 0 | 0 | 0 |
| 0 | 0 | 0 | 0 | 0 | 0 | 0 | 0 |
| 0 | 0 | 0 | 0 | 1 | 1 | 1 | 0 |
| 0 | 0 | 0 | 0 | 2 | 2 | 2 | 0 |
| 0 | 0 | 0 | 0 | 1 | 1 | 1 | 0 |
| 0 | 0 | 0 | 0 | 0 | 0 | 0 | 0 |
| 0 | 0 | 0 | 0 | 0 | 0 | 0 | 0 |

Z22

SYMBOL INFORMATION READER AND SYMBOL INFORMATION READING METHOD

CROSS REFERENCE TO RELATED APPLICATION

The present application claims priority under 35 U.S.C. § 119 to Japanese Application No. 2015-074206 filed Mar. 31, 2015, the entire content of which is incorporated herein by reference.

FIELD OF THE INVENTION

At least an embodiment of the present invention relates to a symbol information reader which optically reads symbol information such as a barcode and outputs the processing information and also relates to a symbol information reading method.

BACKGROUND

A barcode is an example of a symbol information representing various information, in which multiple bars and spaces are alternately arranged. The barcode is used for ID cards in which personal numbers, etc. are recorded in the form of barcodes.

A barcode reader is used to scan the entire surface of such an ID card, take the image in and read a barcode in the image (referring to Patent reference 1). A symbol information reader disclosed in Patent reference 1 acquires the center of gravity position of a symbol labeling map (a barcode map), acquires the left, right, top and bottom edge positions of the barcode symbol on the symbol labeling map, having the center of gravity position as the original point, and detects the position of the barcode symbol.

PATENT REFERENCE

[Patent reference 1] Unexamined Japanese Patent Application Publication 2009-266190

However, in the symbol information reader disclosed in Patent reference 1, the center of gravity position of a symbol labeling map (a barcode map) is acquired when detecting the position of the barcode; therefore, when two or more (i.e., multiple) barcodes of the same kind are present on the single medium, the computation of the center of gravity position becomes inconsistent, making it difficult to distinguish the multiple barcodes from one another.

SUMMARY

At least an embodiment of the present invention provides a symbol information reader capable of distinguishing multiple symbols even when two or more (multiple) symbols of the same kind are present on a single medium, and also to provide a symbol information reading method.

To achieve the above, the symbol information reader of at least an embodiment of the present invention comprises an imaging means for imaging a recording medium on which multiple symbols formed in the same format are recorded, an image memory for saving the image data of the recording medium acquired by the imaging means, and a position-detecting processor for taking the image data in and detecting the positions of the symbols printed on the recording medium; wherein the position-detecting processor includes a provisional area-discriminating section which calculates the change in the luminance value along the scanning direction of the scanning line of the symbol in a predetermined area of the image data and discriminates a provisional area which has a possibility of corresponding to the symbol; a correlation map-creating section which acquires correlations between the provisional area and neighboring areas adjacent in the direction orthogonal to the scanning direction of the scanning line and creates a map showing the area with a high correlation; a labeling unit which searches the correlation map for the presence of the symbol and labels on the area judged having the symbol; an area dividing unit which, based on the labeled area, sets and divides the area for each of the multiple symbols; and a position-determining section which, based on the labeled area for each of the multiple symbols divided at the area dividing unit, detects the position of the symbol which is printed on the recording medium.

In at least an embodiment of the present invention, based on the areas labeled at the area dividing unit, the areas are set and divided for each of the multiple symbols; therefore, even when two or more (i.e., multiple) symbols of the same kind (created in the same format) are present on the single recording medium, the process of detecting the position of the symbol printed on a recording medium can be implemented on the individual, divided area. Consequently, the center of gravity position of each symbol can be stably calculated, making it possible to distinguish the multiple symbols from one another.

It is also preferred in the symbol information processing device of at least an embodiment of the present invention that the area dividing unit include a number-judging section which judges the number of symbols in the symbol labeling map created by the labeling unit and a division processing section which sets and divides the area for each of the multiple symbols in the symbol labeling map, which is judged by the number judging section that two or more symbols are present.

In at least an embodiment of the present invention, the number of the symbols on the symbol labeling map is judged before the division processing is implemented; therefore, when no symbol or only one symbol is present on the symbol labeling map, the division processing itself doesn't have to be implemented (this process can be omitted); consequently, [the division processing] is implemented only when two or more symbols are present, resulting in efficient position detection processing.

Also, in the symbol information processing device of at least an embodiment of the present invention, the division processing section includes a projection-acquiring section which acquires at least the X-axis projection or the Y-axis projection of the entire symbol labeling map, a boundary position-acquiring section which searches the projection profile acquired at the projection-acquiring section for the position at which a valley portion can be recognized and acquires the position of the valley as the boundary position for the area division, and an area-setting section which sets each area for the multiple symbols based on the boundary position acquired at the boundary position acquiring section; the position determining unit detects the positions, at which the symbol is printed on the medium, in the areas respectively set at the area-setting section.

In at least an embodiment of the present invention, the division processing is implemented such that at least one of the axes projections, the X-axis projection or the Y-axis projection of a so-called rectangular coordinate system, of the entire range of the symbol labeling map is acquired, the acquired projection profile(s) is searched for the position at which a valley portion can be recognized, the position at which a valley portion is recognized is acquired as the boundary position for the area division, and an area is set for each of the multiple symbols based on the acquired boundary position; therefore, the areas that should be divided are specified and set. Also, the boundary of the areas of the multiple symbols is acquired by using the projections, making is possible to reduce the computation.

A symbol information reading method of at least an embodiment of the present invention is used in a symbol information reader having an imaging means for imaging a recording medium on which multiple symbols formed in the same format are recorded, an image memory for saving the image data of the recording medium acquired by the imaging means, and a position-detecting processor for taking the image data in and detecting the positions of the symbols printed on the recording medium, comprises: a first step in which the change in the luminance value is calculated along the scanning direction of the scanning line for the symbol in the predetermined area on the image data and judges if the predetermined area is a provisional area having a possibility of corresponding to the symbol; a second step in which correlations between the provisional area with the neighboring areas adjacent in the direction orthogonal to the scanning direction of the scanning line are calculated and a map showing the areas having a high correlation value is created; a third step in which the correlation map is searched for the presence of the symbols and the areas judged as having the symbols are labeled; a fourth step in which, based on the labeled areas, areas are set and divided for the multiple symbols respectively, based on the labeled areas; and a fifth step in which, based on the area labeled for each of the multiple symbols divided at the area division section, the positions of the symbols printed on the recording medium are detected.

In at least an embodiment of the present invention, based on the areas labeled in the fourth step, the areas are respectively set and divided for the multiple symbols; therefore, even when two or more (i.e., multiple) symbols of the same kind (formed in the same format) are present on the recording medium, the processing of detecting the position of the symbol printed on the medium can be implemented on each of the divided areas.

It is preferred in the symbol information reading method of at least an embodiment of the present invention that the fourth step include a judging step in which the number of symbols in the symbol labeling map created by the labeling unit is judged and a division processing step in which areas are set and divided respectively for the multiple symbols in the symbol labeling map, which is judged as having two or more symbols.

In at least an embodiment of the present invention, the number of the symbols on the symbol labeling map is judged before the division processing is implemented; therefore, when no symbol or only one symbol is present on the symbol labeling map, the division processing itself doesn't have to be implemented (this process can be omitted); consequently, [the division processing] is implemented only when two or more symbols are present, resulting in efficient position detection processing.

Also, in the symbol information reading method of at least an embodiment of the present invention, the division processing step includes a projection-acquiring step which acquires at least the X-axis projection or the Y-axis projection of the entire range of the symbol labeling map, a boundary position-acquiring step which searches the projection profile acquired at the projection-acquiring section for the position at which a valley portion can be recognized and acquires the position of the valley as the boundary position for the area division, and an area-setting step which sets each area for the multiple symbols based on the boundary position acquired at the boundary position acquiring section; in the fifth step, the positions at which the symbol is printed on the medium are detected in the areas respectively set at the area-setting section.

In at least an embodiment of the present invention, before the division processing is implemented, at least the X-axis projection of the Y-axis projection of the entire range of the symbol labeling map is acquired, the acquired projection profile is searched for the position at which a valley portion can be recognized and the position of the valley portion is acquired as the boundary position for the area division, and an area is set for each of the multiple symbols based on the acquired boundary position; therefore, the area that needs to be divided can be specified and set. Also, the boundary for the areas of the multiple symbols are acquired by using the projection; therefore, the computation can be reduced.

According to at least an embodiment of the present invention, even when two or more (multiple) symbols of the same kind (created in the same format) are present on a recording medium, the center of gravity position can be accurately calculated, making it possible to distinguish multiple symbols from one another.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which:

FIG. 8 A binary map created by binarizing the image of the recording medium on which the two barcodes are printed, shown in FIG. 6.

FIG. 9 A correlation map, which is obtained from the upper-lower line correlation processing for two barcodes.

DETAILED DESCRIPTION

An embodiment of the present invention is described hereinafter associated with the drawings.

Figure 1:
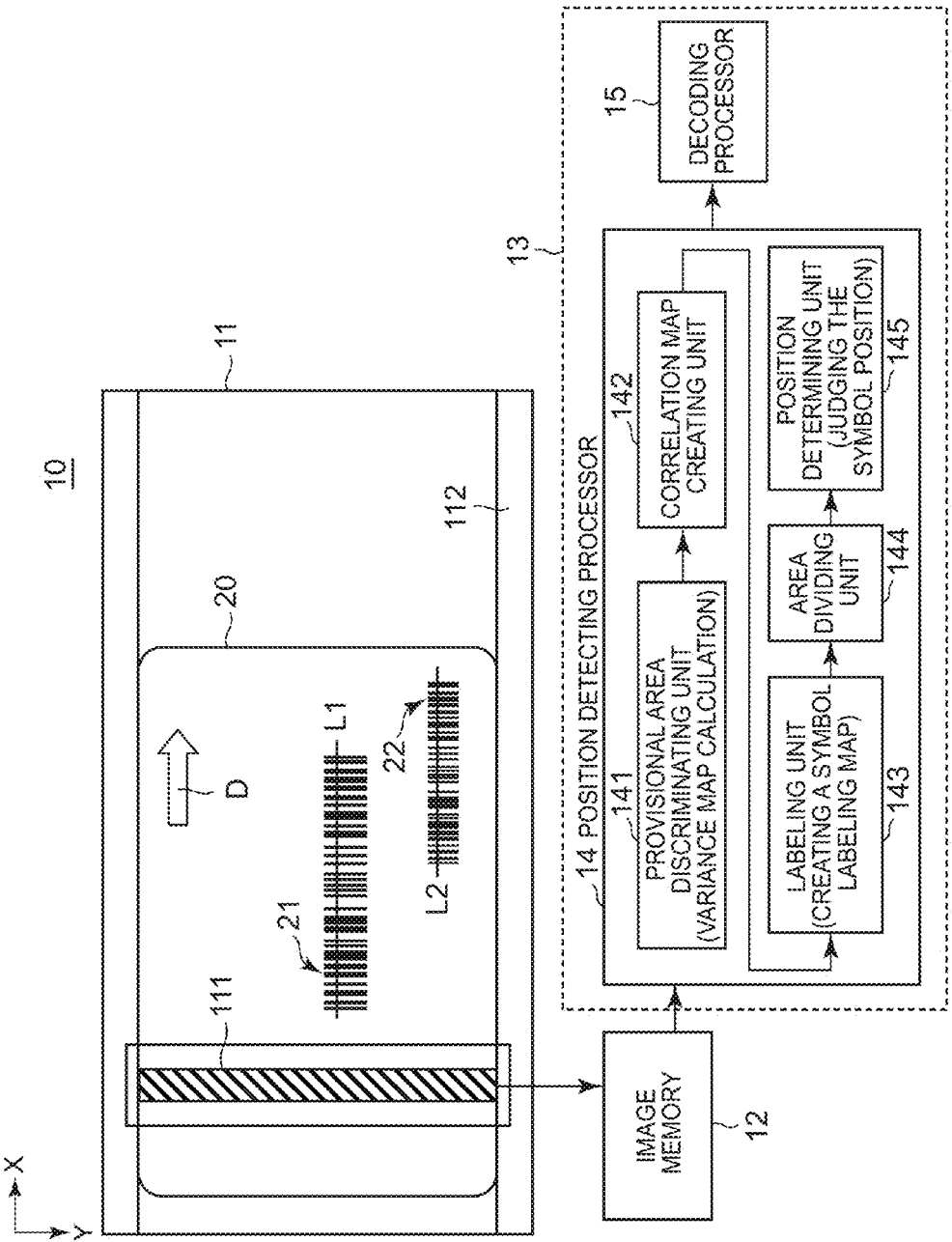
FIG. 1 A diagram showing a configuration example of a symbol information reader of an embodiment of the present invention.

FIG. 1 is a diagram showing a configuration example of a symbol information reader of an embodiment of the present invention.

A symbol information reader 10 of this embodiment is a barcode reader which processes image data acquired by imaging barcodes 21 and 22, in which unique information is given, on a recording medium 20 such as a card.

The barcode reader 10 has an imaging device 11, an image memory 12 as a storage unit, and a data processor 13 as primary components, as shown in FIG. 1.

The imaging device 11 is configured to include a close-contact-type one-dimensional imaging device 111 and a transfer mechanism (including a transfer guide) which transfers a recording medium 20. As shown in FIG. 1, multiple (two in this embodiment) one-dimensional barcodes 21 and 22 of the same kind which are created in the same format are printed (recorded) on the recording medium 20.

In FIG. 1, code D indicates the transfer direction of the recording medium 20. Also, as shown in FIG. 1, code L1 indicates the scanning line of the one-dimensional barcode 21 and code L2 indicates the scanning line of the one-dimensional barcode 22. In other words, the direction in which the scanning lines L1 and L2 scan is the direction along which multiple bars and spaces are alternately arranged. Note that the transfer direction D and the scanning direction of the scanning lines L1 and L2 are indicated by the X-axis direction in this embodiment to simplify the description. The direction orthogonal to the transfer direction D and the direction orthogonal to the scanning direction of the scanning lines L1 and L2 are indicated by the Y-axis direction.

In this embodiment, a contact-type 1D imaging element is adopted for the imaging device 11 to minimize the device; however, the imaging device 11 may adopt a 2D area sensor that reads a character string on the recording medium 20, which is an object for reading. Also, the transfer mechanism has adopted a constant speed transfer mechanism, but also can adopt a manual mechanism. The imaging device 11 is configured by a CCD or a CMOS.

The image memory 12 stores the digitized multi-valued image (grey image) data of the recording medium 20 containing 1D barcodes 21 and 22 captured by the imaging element 11. The original image stored in the image memory 12 is formed such that multiple pixels are arranged in a matrix; more specifically described, though not illustrated, the pixels are arranged in m rows in the X-axis direction and n columns in the Y-axis direction. Each pixel has a pixel value (a luminance value). In this embodiment, each pixel value is any between 0 and 255 by expressing it by 8 bit; the darker the gray gets, the smaller the pixel value is; the whiter the gray gets, the larger the pixel value is. Note that the image memory 12 may take any memory such as a RAM, a SDRAM, a DDRSDRAM or a RDRAM as long as image data can be stored.

The data processor 13 has a position detecting processor 14 and a decoding processor 15 as primary components. The position detecting processor 14 of this embodiment has a provisional area discriminating unit 141, a correlation map creating unit 142, a labeling unit 143, an area dividing unit 144 and a position determining unit 145.

Note that each component configuring the position detecting processor 14 can be materialized with a hardware such as a CPU, a ROM and a RAM. Although, in this embodiment, the position detecting processor 14 and the decoding processor 15 are illustrated as separate components, the decoding processor 15 may be built in the position detecting processor 14.

The provisional area discriminating unit 141 calculates changes in luminance values along the scanning direction (the X-axis direction) of the one-dimensional scanning lines L1, L2 for the 1D barcodes 21, 22 in a predetermined area of the multi-valued image (grey image) data retrieved from the image memory 12 and judges (discriminates) a provisional area having a possibility of corresponding to the 1D barcode.

The provisional area discriminating unit 141 uses variance or standard deviation to calculate the change in luminance values. The provisional area discriminating unit 141 of this embodiment calculates a variance map, for example, and judges whether it is a provisional area or not according to the result of the variance map. In other words, the provisional area discriminating unit 141 of this embodiment is configured to include a function to calculate a variance map. A more concrete example of the provisional area map, a grid-like variance map composed of multiple blocks (sections, partitions) of the same size, which are periodically arranged, is described later. Note that each block is a so-called "unit block" which is a unit to acquire coordinates on the image space such as a 1D barcode. Each block has a standard dimension in the X-axis direction and Y-axis direction, and each block is a rectangular shape having the length in the X-axis direction longer than the length in the Y-axis direction. For example, the 1D barcode 22 takes three blocks in the X-axis direction and three blocks in the Y-axis direction, which make nine blocks in total. For example, the 1D barcode 21 takes five blocks in the X-axis direction and four blocks in the Y-axis direction, which make twenty blocks in total.

The correlation map creating unit 142 acquires correlations of the provisional area discriminated by the provisional area discriminating unit 141 with the neighboring areas adjacent in the direction orthogonal to the scanning direction of the scanning lines L1, L2 and creates a correlation map that shows the areas of high correlation value.

The correlation map creating unit 142 of this embodiment implements a so-called correlation calculations with respect to the lines above and below the objective lines in order to discriminate a barcode symbol from the rest. In other words, the correlation map creating unit 142 calculates, with respect to each element with a value '1' on the grid-like variance map, correlations of the luminance on the lines between the objective block (line) and the neighboring blocks (lines) adjacent right above and right below. If those blocks contain a barcode symbol, their correlation values should be large.

More specifically described, the correlation map creating unit 142 creates a correlation map on the grid coordinates. As described later, if the correlation values between the objective line and the lines right above and right below are large, the correlation map creating unit 142 adds a point (value) '1' to the element; when the correlations of the objective line with both lines above and below are high, the unit 142 adds a point (value) '2' to the element (block).

The labeling unit 143 searches the correlation map created at the correlation map creating unit 142 for the presence of a basic pattern which contains three elements, for example, or a pattern which contains more elements, while shifting on the elements on the map one by one (shifting in the scanning direction ((in the X-axis direction)) in this embodiment) and labels the area in the 1D barcode judged as having a basic pattern or a pattern that contains more elements than three.

In the basic pattern search processing at the labeling unit 143, a basic pattern in the 1D barcode is searched for in the correlation map. For example, assuming that a minimum size (unit) of a barcode to be detected corresponds to the pattern indicated by [2 2 2] on the correlation map, in which a value '2' is consecutively labeled on three elements, when this mask pattern is detected through the search of the correlation map, a value '1' is set in the map elements occupied by this pattern and a value '0' in the rest of the map elements.

As described above, when the recording medium 20 on which multiple (two in this embodiment) 1D barcodes 21 and 22 are printed (recorded) is read, there is high probability that there are multiple areas labeled as that a 1D barcode having the above-described standard pattern or a pattern containing more elements than the standard pattern is present, in the symbol labeling map (the barcode map) labeled at the labeling unit 143. The symbol labeling map labeled at the labeling unit 143 is supplied to the area dividing unit 144.

The area dividing unit 144 sets an area for each of the multiple 1D barcodes, based on the areas labeled in the symbol labeling map (corresponding to the barcode map) supplied from the labeling unit 143, and the area division is implemented on the symbol labeling map.

The area dividing unit 144 of this embodiment judges on how many 1D barcodes are present, zero, one, two or more, in the symbol labeling map; when judged that two or more 1D barcodes are present, the area division is implemented on the symbol labeling map.

Figure 2:
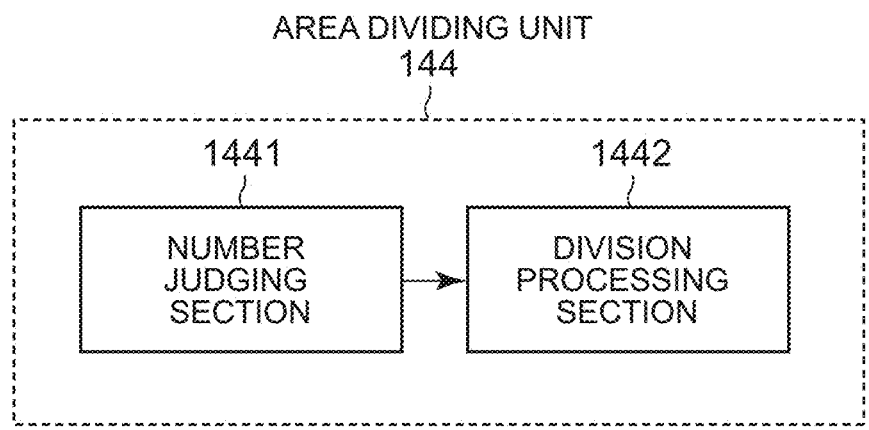
FIG. 2 A block diagram showing a configuration example of an area-diving section of this embodiment.

FIG. 2 is a block diagram showing a configuration example of the area dividing unit of this embodiment.

As shown in FIG. 2, the area dividing unit 144 has a number judging section 1441 and a division processing section 1442.

The number judging section 1441 judges the number of the symbols in the symbol labeling map created at the labeling unit 143. The number judging section 1441 makes judgment on how many 1D barcodes are present in the symbol labeling map, zero, one, two or more.

The number judging section 1441 implements the number judgment in the following manner. The number of the elements having a value "1" is counted on the symbol labeling map (in the barcode map) as C0. Also the number of the elements having a value "1" within the area surrounded by four sides of the 1D barcode which is acquired having the center of gravity position (COG) as its original point on the symbol labeling map (the barcode map), is counted as C1.

The number judging section 1441 judges:
when C0=0, there is no 1D barcode;
when C0>0 and C0=C1, one 1D barcode is present; and
when C0>0 and C0≠C1, two or more 1D barcode are present.

The division processing section 1442 implements the processing of setting an area for each of the multiple 1D barcodes in the symbol labeling map which is judged as containing two or more 1D barcodes, and making divisions.

For the area division, the division processing section 1442 of this embodiment acquires a projection 'projX' created by projecting the entire range of the symbol labeling map (the barcode map) onto the X-axis of the rectangle coordinate system shown in FIG. 1, etc. and a projection 'projY' created by projecting the symbol labeling map onto the Y-axis, searches a position that can be recognized as a valley in the acquired projection profiles, acquires the valley position as a boundary position (a boundary line), and sets the areas R1, R2, . . . respectively for the multiple (two in this embodiment) 1D barcodes 21, 22 based on the acquired boundary position, and makes divisions.

When two 1D barcodes 21 and 22 are present as in this embodiment, for example, at least the X-axis projection 'projX' or the Y-axis projection 'projY' has or both projections have a profile having two peaks and one valley, unless both 1D barcodes are connected. Therefore, the division processing section 1442 can acquire the boundary positions in the X-axis direction and the Y-axis direction (the coordinates of the separating position) of the two 1D barcodes by determining the position of the valley on the X-axis projection 'projX' and the Y-axis projection 'projY'.

The division processing section 1442 sets the two areas which are separated in the X-axis direction and the Y-axis direction as R1 and R2, for example. The following processing applies the same processing as the one, which is used for the map having only one 1D barcode, on each of the areas R1 and R2 to determine the position of each of the 1D barcode.

Figure 3:
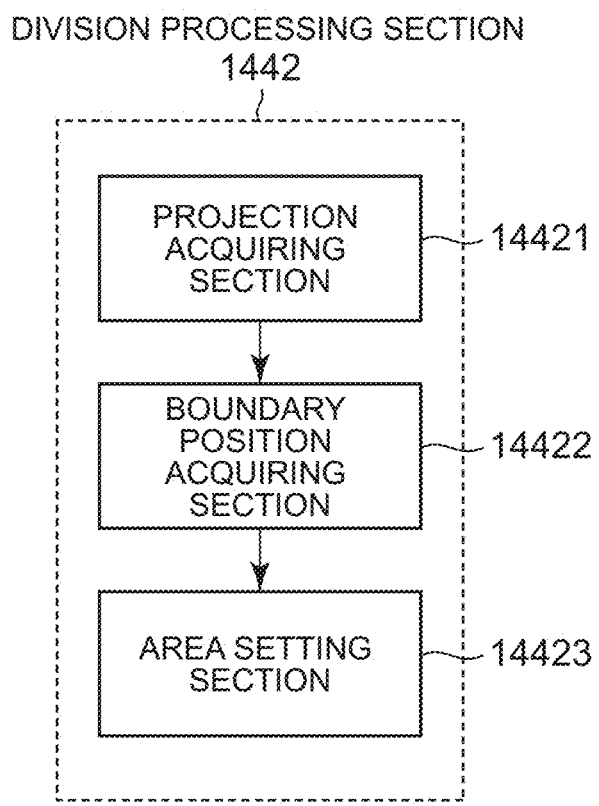
FIG. 3 A block diagram showing a configuration example of a division processing section that uses the projections of FIG. 2.

FIG. 3 is a block diagram showing a configuration example of the division processing section shown in FIG. 2.

The division processing section 1442 has a projection-acquiring section 14421, a boundary position-acquiring section 14422, and an area-setting section 14423.

For the area division, the projection-acquiring section 14421 acquires a projection 'projX' created by projecting the entire range of the symbol labeling map (the barcode map) onto the X-axis of a rectangular coordinate system and a projection 'projY' created by projecting the map onto the Y-axis.

The boundary position-acquiring section 14422 searches the profile of the projection acquired at the projection acquiring section 14421, the outline of which is expressed in the figure, etc. for a position at which a valley portion is recognized, and acquires the position of the valley portion as the boundary position (the y-coordinate or the x-coordinate of the separating position) 'ydiv' or 'xdiv' for the area division.

The area-setting section 14423 sets each area R1, R2, . . . of the multiple (two in this embodiment) 1D barcodes, based on the boundary position(s) acquired at the boundary position-acquiring section 14422.

Also, the area-setting section 14423 has a function to re-confirm the number of the barcodes in each of the set area. By this function, the number of the barcodes which are present in the division areas can be confirmed; therefore, while re-confirming the result of the division processing, the area division can be implemented. For example, if the number is different from the number that has been judged previously, it can be understood that some kind of abnormality has occurred.

The division processing section 1442 having such a configuration can be configured such that the projection-acquiring section 14421 acquires the X-axis projection 'projX' and the Y-axis projection 'projY' of the entire range of the symbol labeling map, searches the X-axis projection or the Y-axis projection for a position at which a valley portion can be recognized, and if no position of the valley portion can be acquired in the projection it has searched, searches the other-axis projection for a position at which a valley portion can be recognized.

Alternatively, the division processing section 1442 may be configured such that the projection-acquiring section 14421 first acquires only one projection to either axis, X-axis projection 'projX' or the Y-axis projection 'projY', of the entire range of the symbol labeling map, and if no position at which a valley portion can be recognized is acquired by the boundary position-acquiring section 14422, acquires the projection to the other axis, the X-axis or the Y-axis, of the entire range of the symbol labeling map, and the boundary position-acquiring section 14422 searches the projection for a position at which a valley portion can be recognized.

The position determining unit 145 detects the position at which the 1D barcode is printed on the recording medium 20, based on the area labeled for each of the symbols of the multiple 1D barcodes, which are divided at the area dividing unit 144.

The position determining unit 145 calculates the center of gravity position of each of the labeled areas to determine the positions on the X-axis and on the Y-axis (the top, bottom, left and right edge positions in the figure) of the 1D barcode. And then, based on the calculated positions, the positions on the X-axis and on the Y-axis (the top, bottom, left and right positions) of the barcode on the image space coordinates.

The symbol position judgment processing by the position determining unit 145 begins with the calculation of the center of gravity position ('ycog', 'xcog') of the symbol labeling map (the barcode map). The center of gravity position is calculated based on the common definition.

When multiple 1D barcodes are present and divided as individual 1D barcode at the area dividing unit 144, the X-axis projection 'projX' and the Y-axis projection 'projY' of the entire range of the symbol labeling map are acquired for each 1D barcode in the division area and the center of gravity position is acquired for each 1D barcode.

Next, the position determining unit 145 calculates edge positions at the left, right, top and bottom of the 1D barcode. The position determining unit 145, using the center of gravity position coordinate 'xcog' as the starting point on the symbol labeling map (the barcode map), detects the left and right edge positions within a horizontal extent as 'xstart' and 'xstop', at which the sum of the elements becomes zero (the range of calculation is 'ycog±2'), and then terminates the detection operation. The top and bottom edge positions are detected within a vertical extent as 'yupper' and 'ylower', at which the sum of the elements becomes zero (the range of calculation is ['xstar't, 'xstop']), using 'ycog' as the original point on the barcode map and then the detection operation is terminated.

Thus, four sideline positions of the barcode symbol are specified on the grid coordinate system. Then, the position determining unit 145 calculates the coordinates in the image space, based on the coordinates of the four sidelines.

When the number of the symbols on the recording medium 20 is only one and the area dividing unit 144 does not implement an area division, the position determining unit 145 detects the position of the 1D barcode printed on the recording medium 20 from the entire arrange of the symbol labeling map.

In the symbol information reader 10 having such configuration, the recording medium 20 on which the 1D barcodes 21 and 22 are printed (recorded) is transferred along the transfer guide of the transfer mechanism 112; as passing by the 1D imaging element 111, the image of the card is photoelectrically converted; the multi-valued image (grey image) data is taken into the image memory 12 and saved there.

In the data processor 13, the image data containing the barcode symbol 21 is retrieved from the image memory 12 and various processing is applied on the retrieved image data. In this embodiment, the position of the barcode symbols 21 and 22 printed on the recording medium 20 are detected by the position detecting processor 14 in the data processor 13.

Figure 4:
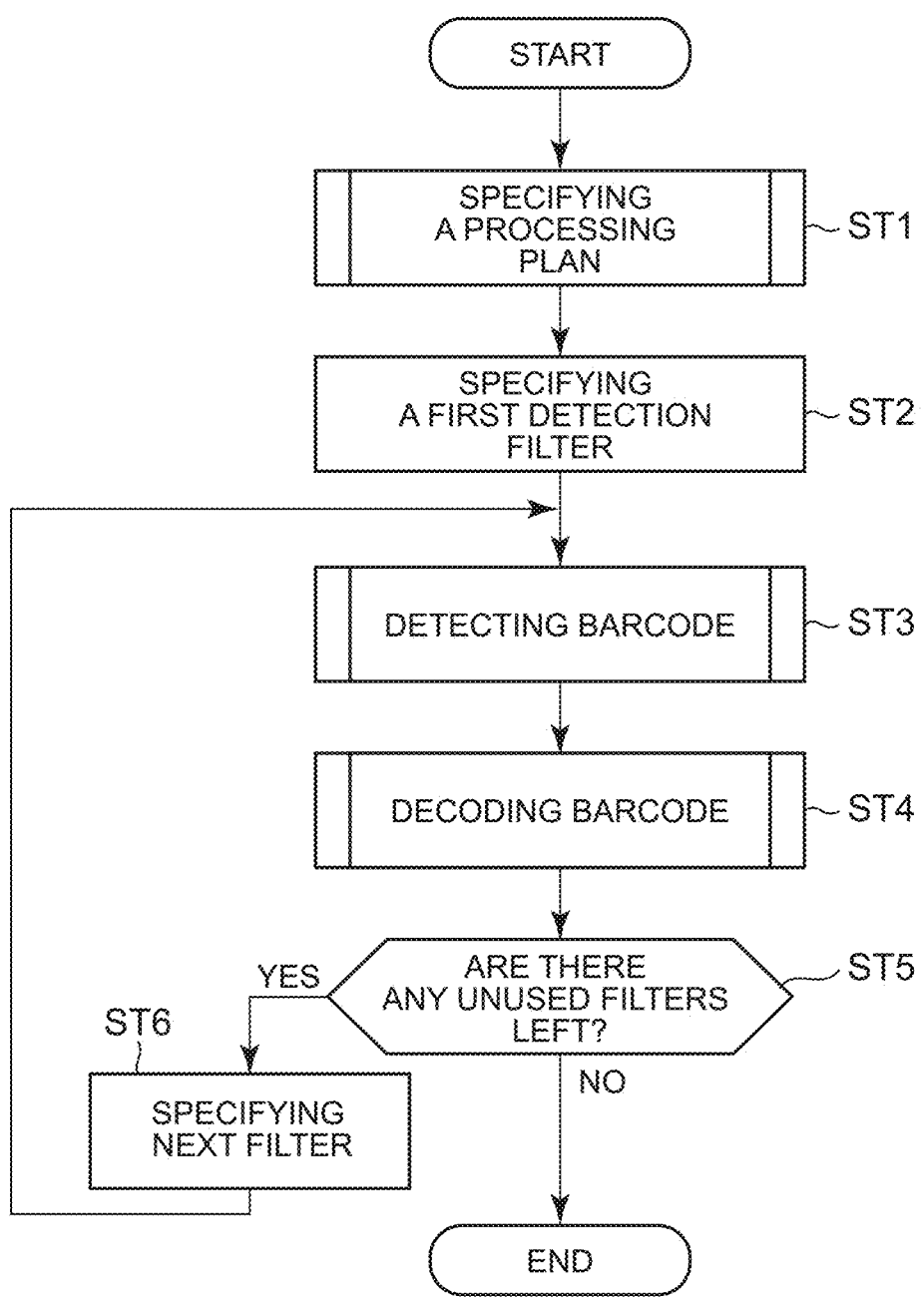
FIG. 4 A flowchart showing the flow of the symbol information reading processing of this embodiment of the present invention.

In the symbol information reader 10 of this embodiment, the decoding processing is applied on the 1D barcode according to the flowchart shown in FIG. 4. The symbol information reading processing of this embodiment is described in detail hereinafter associated with the drawings.

[Overview of Symbol Information Reading Processing]

FIG. 4 is a flowchart showing the flow of the symbol information reading processing of the embodiment of the present invention. The flow of the symbol information reading processing of this embodiment of the present invention is described associated with FIG. 4.

First, a process plan is specified (Step ST1). More specifically described, a type of barcode detector (a detection filter) and the application order are specified according to the type of the barcode symbol printed on the recording medium 20 or the type of a barcode symbol to be read. Although a first detection filter (one of the basic barcode patterns described later) is specified by default (Step ST2), the application order may be changed depending on the appearing frequencies of barcodes, for example.

Then, a barcode detection is carried out (Step ST3). More specifically described, by photoelectric conversion, the imaging element 111 of the symbol information reader 10 images the recording medium 20 containing the 1D barcodes 21 and 22 that has moved along the card transfer mechanism (the transfer guide) 112 to a predetermined position. The captured multi-valued image (grey image) data containing the 1D barcodes 21 and 22 is stored in the image memory 12.

Subsequently, in the position detecting processor 14 in the data processor 13, the decoding processor 15 implements a series of processing for barcode detection prior to the barcode decoding processing. Though the detail of the processing will be described later, the series of the processing can be summarized as follows. In other words, the position detection processor 14 retrieves the multi-valued image (grey image) data stored in the image memory 12; the provisional area discriminating unit 141 implements a variance map calculation; then the correlation map creating unit 142 implements the correlation calculations with respect to the lines above and below the objective lines. The labeling unit 143 implements a basic pattern search; the position determining unit 144 implements an area division processing for each barcode; and the position determining unit 145 implements a symbol position judging processing. Through the above operations, the presence of the barcode is determined as a duty of the first detection filter described above; if the presence is identified, the position of the barcode symbol is determined.

Then, a decoding operation is implemented on the barcode by the decoding processor 15 of the data processor 13 (Step ST4). More specifically described, the decoding processor 15 of the data processor 13 implements a decoding operation on the barcode symbols 21 and 22 (a data decoding along the scanning lines L1 and L2) based on the positions of the barcode symbols 21 and 22 analyzed in Step ST3.

When there are any more barcodes to be detected, or in other words, when there is any detection filter unapplied (Step ST5: YES), a next detection filter is applied (Step ST6) and the operation moves to Step ST3 for another symbol detection and symbol decoding (Step ST3 and Step ST4).

On the other hand, when there is no more detection filter unapplied (Step ST5:NO), a series of reading operations on the symbol information ends.

Note that an operation for switching detection filters may be implemented, for example, by either the labeling unit 143 of the position detecting processor 14 or the decoding processor 15. The switching order of detection filters may be determined according to the appearing frequencies of barcodes, for example. These dispositions can increase efficiency of the symbol information reading processing. The present embodiment includes the steps of specifying the processing plan (Step ST1) and renewing the detection filter (Step ST6), considering a possibility that one media may contain multiple number of 1D barcodes of the same kind or multiple kinds; however, these steps can be omitted, and the process may be completed only with Step ST3 and Step ST4 instead.

[More Specific Processing of Symbol Detection]

Figure 5:
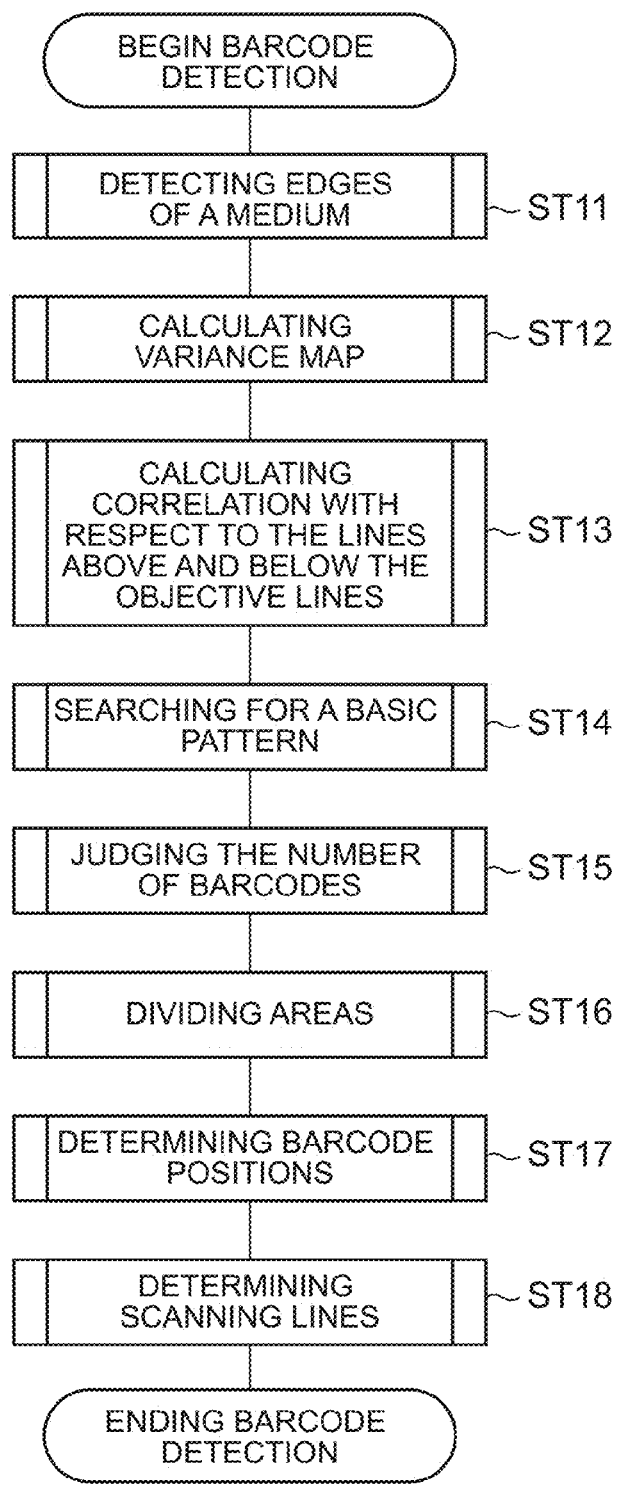
FIG. 5 A flowchart showing the flow of the information processing regarding the barcode detection in FIG. 4.

FIG. 5 is a flowchart showing the flow of the information processing regarding the barcode detection in Step ST3 in FIG. 4.

In FIG. 5, the edge positions at the top, bottom, right and left of the recording medium 20 are detected at first (Step ST11). More specifically described, the provisional area discriminating unit 141 detects the edge positions at the top, bottom, right and left as a preprocessing step for a variance map calculation, using the image data of the recording medium 20 stored in the image memory 12.

Figure 6:
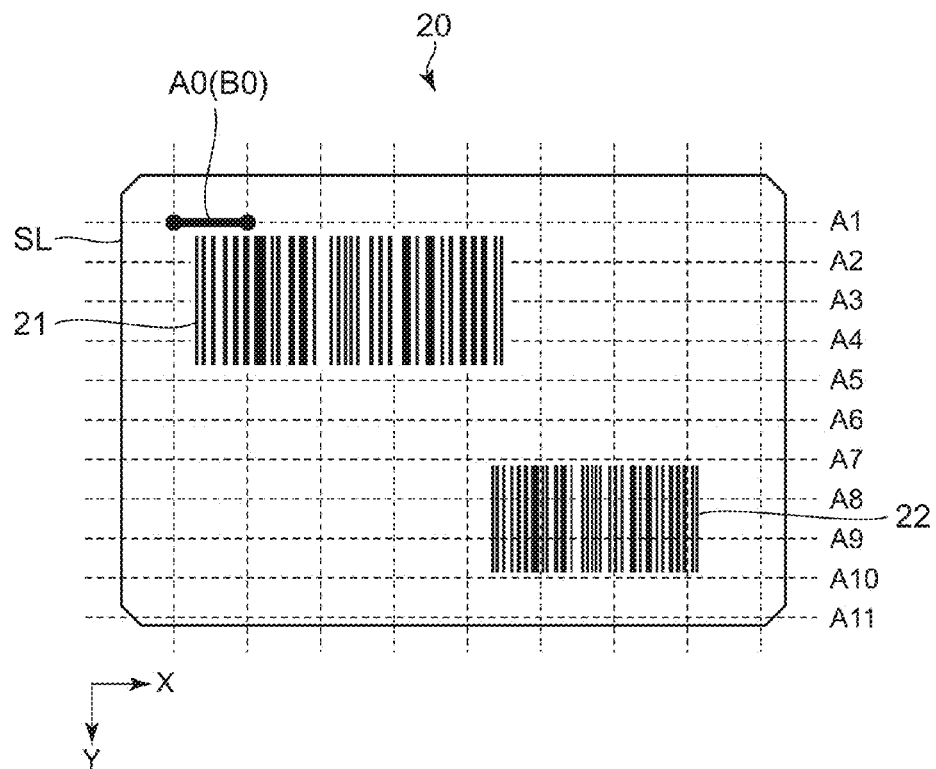
FIG. 6 A figure showing an example of the image data of a recording medium which has two one-dimensional barcodes saved in an image memory.

FIG. 6 shows an example of the image data of the recording medium 20, having two 1D barcodes, stored in the image memory 12. In FIG. 6, a solid line SL outlining the recording medium 20 shows the edge positions of the recording medium 20, acquired by the edge detection processing. Also, the vertical and horizontal dashed lines in FIG. 6 indicate the lines dividing the entire image space into a grid arrangement of small blocks based on the edge line. (Creation of Variance Map)

Next, a variance map calculation is implemented at the provisional area discriminating unit 141 (Step ST12). More specifically described, the provisional area discriminating unit 141 segments the whole image space into a grid arrangement of small blocks by using the edge lines as baselines as FIG. 6 shows, and calculates the changes in luminance value, the variance, for example, along a line in each block. The line in each block is formed in the same direction as the scanning direction of the scanning lines L1 and L2 for the barcode symbols 21 and 22 shown in FIG. 1, and it is, for example, a line indicated by code A0 (B0) shown in FIG. 6.

Figure 7:
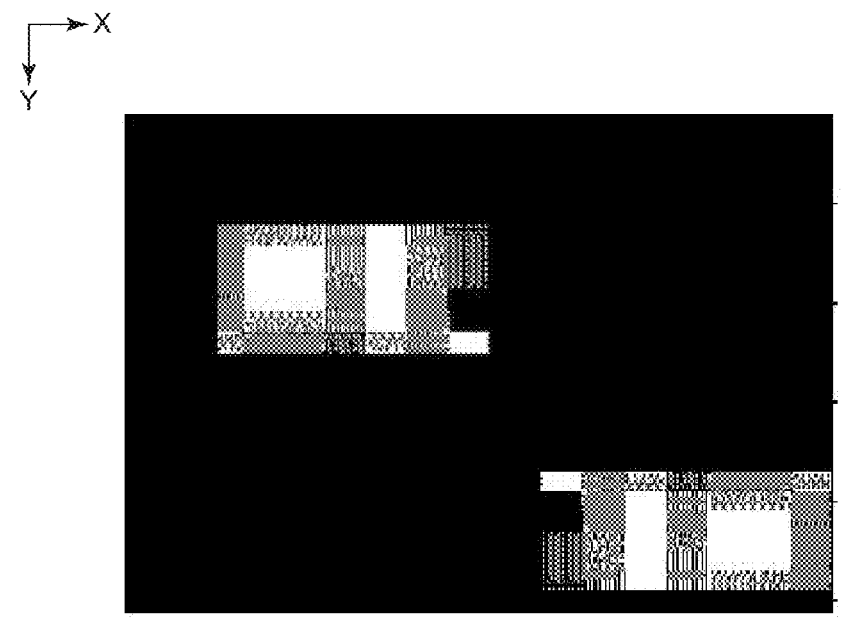
FIG. 7 A figure expressing the map number by the image, which is created based on the image data shown in FIG. 6.

As a result of the same calculation for all the grid blocks, a map on the amount of change in the luminance value based on the grid coordinates can be obtained. FIG. 7 shows the map numerical values of the recording medium 20, on which two 1D barcodes of FIG. 6 are printed, expressed by an image. In FIG. 7, white sections represent blocks having large change while black sections represent blocks having small change. The sections having large change correspond to the positions of the 1D barcodes 21 and 22 shown in FIG. 6.

Binarization of the map of FIG. 7 results in the data shown in FIG. 8. As a threshold for binarization, an appropriate value can be specified on the basis of the distribution of the amount of changes in the luminance value. FIG. 8 is a result of binarizing the map of FIG. 6, which is the imaged recording medium 20 on which two 1D barcodes 21 and 22 are printed.

FIG. 8 is described below in detail.

For example, on the first column from the left end of the map of FIG. 8, number values are arranged in the order of [0,1,1,1,1,0,0,0,0,0,0] from the top (in the section circled with dotted line X1). This corresponds to the result of binarizing the variance of each single line, A1 to A11 in FIG. 6, with a predetermined threshold. FIG. 8 shows that a value '1' is set in twenty blocks which form a rectangle area (the area indicated with bold line Z11) (one of the columns in this rectangle has A2, A3, A4 and A5 in FIG. 6) which corresponds to the position of the barcode symbol 21 of FIG. 6.

For example, on the third column from the right end of the map of FIG. 8, number values are arranged in the order of [0,0,0,0,0,0,1,1,1,0,0] from the top (in the section circled with dotted line X2). This corresponds to the result of binarizing the variance of each single line, A1 to A11 in FIG. 6, with a predetermined threshold. FIG. 8 shows that a value '1' is set in nine blocks which form a rectangle area (the area indicated with bold line Z21) (one of the columns in this rectangle has A7, A8 and A9 in FIG. 6) which corresponds to the position of the barcode symbol 22 of FIG. 6.

For example, on the fourth column from the right end of the map of FIG. 8, number values are arranged in the order of [0,1,1,1,1,0,1,1,1,0,0] from the top (in the section circled with dotted line X3). This corresponds to the result of binarizing the variance of each single line, A1 to A11 in FIG. 6, with a predetermined threshold. This indicates that there is an area at which the right edge portion of the area of the 1D barcode 21 indicated with code Z11 overlaps with the left edge portion of the area of the 1D barcode 22 indicated by code Z21.

Thus, the provisional area discriminating unit 141, which detects the positions of the top, bottom, right and left edges (Step ST11 in FIG. 5) and calculates a variance map (see FIG. 8) (Step ST12 of FIG. 5), calculates the changes in the luminance value along the scanning line in a predetermined area of the image data and judges (identifies) a provisional area having a possibility of corresponding to the 1D barcode. The "provisional area" described above corresponds to the area Z11 consisting of twenty blocks, each of which is provided with a value '1', and to the area Z21 consisting of nine blocks, each of which is provided with a value '1', as described above.

In the map shown by FIG. 8, the section of the image corresponding to the blocks provided with a value '1' has a high probability of matching with the 1D barcode area, but it may not necessarily be the barcode area. In other words, there may exist an area which does not contain the 1D barcodes 21, 22 but has blocks with '1'. Such an area has a chance of being judged as a "provisional area".

(Creation of Correlation Map)

Next, correlation calculations with respect to the lines above and below the objective lines are implemented in Step ST13 of FIG. 5. The step by the correlation map creating unit 142 discriminates the areas of the 1D barcodes 21 and 22 from the rest. More specifically described, with respect to each element provided with a value '1' on the grid map, correlations on luminance of the lines mutually shared by the corresponding block (line) and the neighboring blocks (lines) right above and right below it are calculated. If the blocks (lines) contain the 1D barcode 21 or 22, the correlation value must be a large value. More specifically described, the correlation map creating unit 142 creates a line correlation map on the grid coordinate system.

FIG. 9 shows a correlation map which is a calculation result of correlations with the lines above and below the objective lines when two 1D barcodes are present. More specifically described, with respect to the lines formed parallel to the scanning direction of the scanning line for the barcode 21, 22 when the correlation value of an objective line with either the line above or the line below is large, a value (point) '1' is added to the element; when the correlation values of an objective line with both the line above and the line below are large, a value (point) '2' is added to the element. One caution to be considered on this occasion is that the objective data is not the data shown in FIG. 8 (binary data by '0' and '1'), but the image data shown in FIG. 4 is the objective data.

The lines used to generate the points (values) at twenty blocks within the area Z11 shown in FIG. 8 correspond to the twenty lines surrounding the 1D barcode 21 in FIG. 6. For example, the four lines used to generate points (values)([1, 2,2,1] from the top) in the left column in the area Z12 shown in FIG. 9 are the lines A1 through A4 in FIG. 6. The correlation calculations of the line A2 with the line above and the line below are carried out by calculating a correlation value between A2 and A1 as well as a correlation value between A2 and A3. Due to the characteristics of the 1D barcode 21, the correlation between A2 and A3 is significantly large (infinitely becoming '1'). As a result, a point '1' is provided. When calculating a correlation of the line A4, a point '1' is provided in the same manner. When calculating a correlation regarding the line A3, a correlation of A3 with A2 becomes significantly large as well as a correlation of A3 with A4; therefore, a point '2' is provided. In the above manner, the points in the left column of the area Z12 are determined as [1,2,2,1]. In the same manner, the points in the second through fifth columns from the left in the area Z12 are determined as [1,2,2,1] and the points in the right column as [1,2,2,1].

In the same manner, the lines used to generate points (values) in nine elements in the area Z21 in FIG. 8 are the nine lines enclosing the 1D barcode 22 in FIG. 6. For example, the three lines used to generate points (values) in the left column in the area Z22 shown in FIG. 7 (a section of [1, 2, 1] from the top) are namely A7 to A9 in FIG. 6. The correlation calculations of the objective line A7 with the line above and the line below are carried out by calculating a correlation value between A7 and A6 as well as a correlation value between A7 and A8. Due to the characteristics of the 1D barcode 22, the correlation value between A7 and A8 is significantly large (infinitely becoming 1). As a result, a point (value) '1' is added. The correlation calculations of the objective line A9 with the line above and the line below are carried out in the same manner, and a point (value) '1' is added in the same manner. The correlation calculations of the objective line A8 with the line A7 and the line A9 are carried out in the same manner; however, both correlation values become significantly large and therefore a point (value) '2' is added. In this way, each point of [1, 2,1] is set for the left column within the area Z. Each point of [1, 2, 1] in the middle column and each point of [1, 2, 1] in the right column within the area Z are set in the same manner.

As FIG. 8 shows, the element provided with a point (value) '2' indicates that it has significant vertical correlations. Such elements reflects the characteristics of a barcode in which the same line patterns are vertically stacked, and it is considered to have a high probability of conforming to a barcode area. Thus, the correlation map creating unit 142 for implementing correlation calculations of objective lines with the line above and the line below (Step ST13 of FIG. 5) calculates correlations of the above-mentioned provisional area with the neighboring areas adjacent in the direction orthogonal to the scanning direction (in the Y-axis direction in FIGS. 6 and 8) of the scanning lines for the 1D barcodes 2l, 22 (refer to code L1, L2 in FIG. 1) to create a map that shows the areas having a high correlation value. In this embodiment, as explained by referring to the areas Z12 and Z22 of FIG. 9, the correlations of the provisional area with two neighboring areas adjacent in the top-bottom direction (i.e., the line above and the line below) are calculated. Then, a correlation map is created while differentiating a first case in which each of the two correlation values is larger than a predetermined threshold (the case where a point (value) '2' is added) from a second case in which either one of the two correlation values is larger than the predetermined threshold (the case where a point (value) '1' is added). In this manner, a correlation map can be created to accurately recognize the positions of the 1D barcodes 21 and 22 (refer to FIG. 9).

(Search for a Basic Pattern)

Next, a basic pattern search is implemented at the labeling unit 143 (Step ST14 of FIG. 5). More specifically described, the labeling unit 143 searches the correlation map for the presence of a basic barcode pattern in the 1D barcode. For example, under the condition where the minimum size (unit) of the detected 1D barcode corresponds to a basic pattern (a row of points) of [2, 2, 2] arranged in the scanning direction (X-axis direction) on the correlation map, the labeling unit 143 searches the correlation map of FIG. 9; when the basic pattern of [2, 2, 2] is detected, a point (value) '1' is set in each of the map elements occupied by the basic pattern and '0' in any other elements. The patterns of the four elements of [2,2,2,2] and the five elements of [2,2,2,2,2] which are more than the basic pattern of the three elements of [2,2,2] can be detected as the 1D barcodes. This operation on the correlation map shown in FIG. 9 results in a symbol labeling map (a barcode map) SLM1 which includes the areas Z13 and Z23 in FIG. 10. Note that, in this embodiment, the elements of [2,2,2,2,2] is needed in addition to the basic pattern [2,2,2] in response to the two 1D barcodes 21 and 22.

Figure 10:
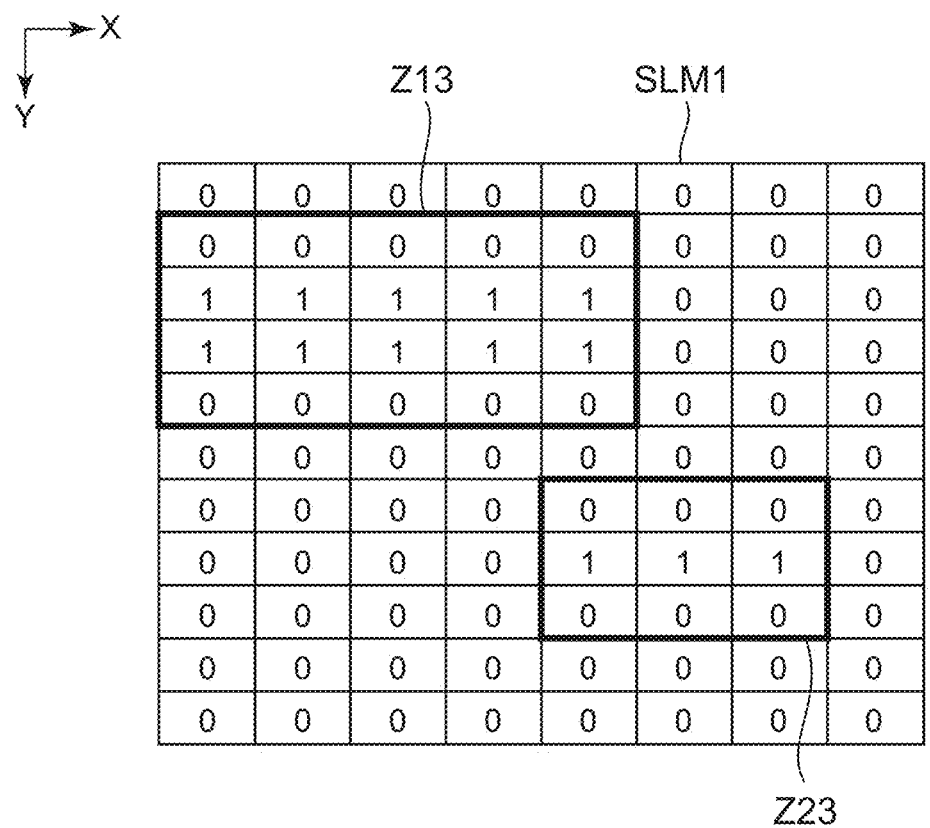
FIG. 10 A symbol labeling map (a barcode map) obtained, based on the correlation map shown in FIG. 9.

FIG. 10 is a symbol labeling map (a barcode map) resulted from the correlation map shown in FIG. 9. Thus, the labeling unit 143 for implementing a basic pattern search (Step ST14 of FIG. 5) searches the correlation map for the presence of basic patterns of a barcode [2, 2, 2] and [2,2,2,2,2] and labels the areas judged as having the basic patterns (setting a point '1' in each of the map elements in this embodiment).

The binary map of the imaged recording medium 20 on which the two 1D barcodes 21 and 22 of FIG. 6 are printed has been described in detail referring to FIG. 8. Note that when binarizing the map of the imaged recording medium on which one 1D barcode is printed, the basic processing on such a map is the same as the processing described associated with FIG. 8, except for the above-described processing implemented on one 1D barcode.

Note that a pattern [2,2,2,2,2] is needed in addition to the basic pattern [2,2,2] to correspond to the two 1D barcodes 22 and 21. Although a basic pattern of three elements [2,2,2] and another pattern of five elements [2,2,2,2,2] are used here, the form of a barcode which is an object for reading can be varyingly modified, such as a pattern consisting of four elements, six elements or more in one line or a pattern consisting of six elements laid out, three in the upper row and three in the lower row each. Also, in this embodiment, the correlations of an objective line with the areas (i.e., lines) neighboring in the direction orthogonal to the scanning direction of the scanning lines are calculated; then, the area in which each of two correlation values is larger than a predetermined threshold is labeled as the area judged as having the 1D barcode. With any character areas being excluded appropriately in this way, the highly reliable area (only areas where the 1D barcodes 21 and 22 exist) can be an object to the search.

The labeling unit 143 of the position detecting processor 14 stores one or more basic barcode patterns or a pattern having more elements (detection filters). Then, the basic barcode pattern and the pattern having more elements change sequentially in a series of the barcode reading operation as already described with reference to the flowchart of FIG. 2 (Step ST5 and ST6 of FIG. 2). Consequently, the labeling unit 143 implements the basic pattern search using the basic pattern and a predetermined pattern of the multiple barcodes.

In this embodiment, prior to the symbol position judgment at the position determining unit 145, a judgment on the number of barcodes (Step ST15 of FIG. 50 and an area division processing (Step ST16 of FIG. 50) are implemented at the area dividing unit 144.

At the number judging section 1441 of the area dividing unit 144, the number of symbols in the symbol labeling map SLM1 created at the labeling unit 143 is judged. The number judging section 1441 judges how many 1D barcodes, zero, one, two or more, are in the symbol labeling map (the barcode map).

Figure 11:
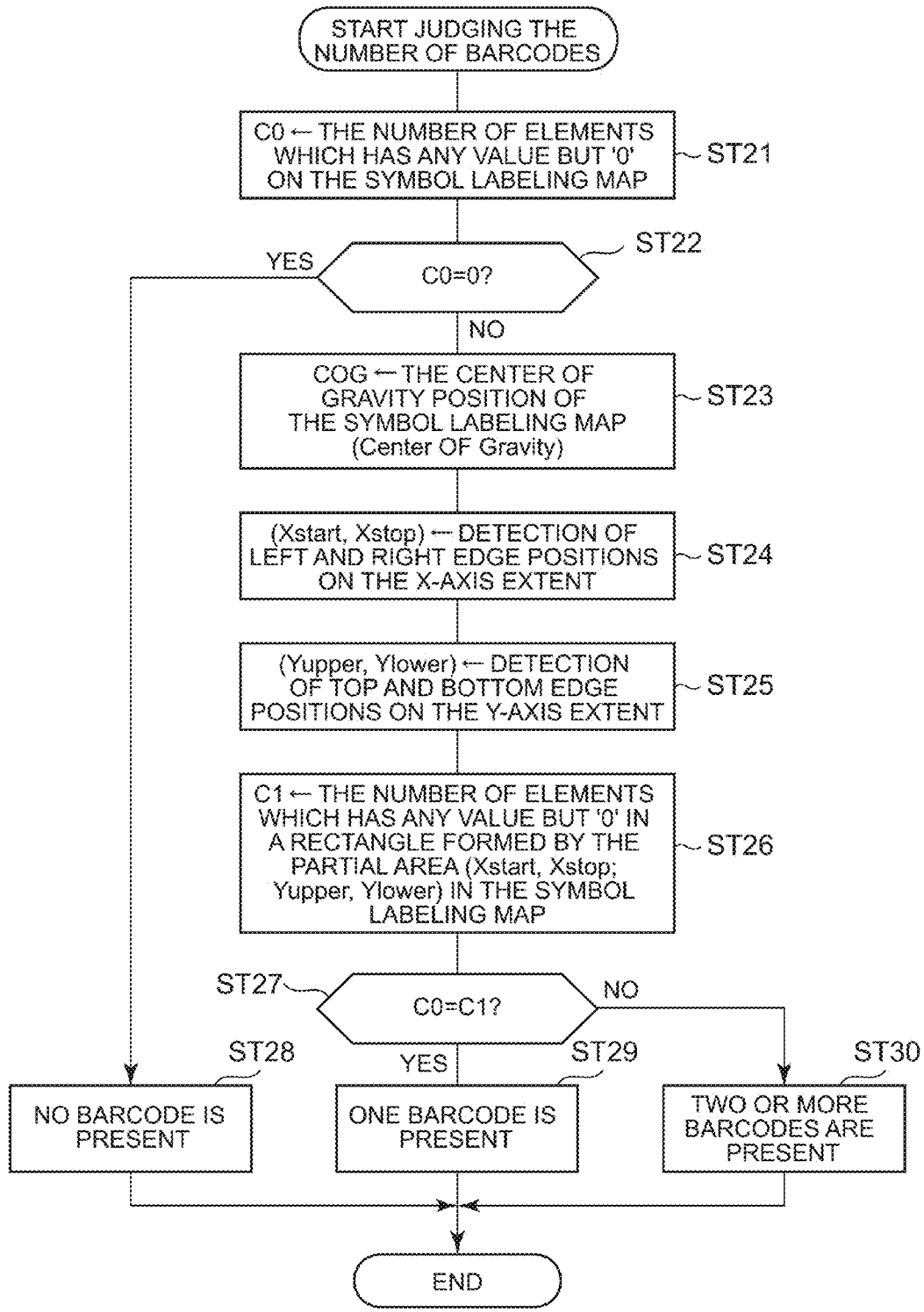
FIG. 11 A flowchart to explain an example of the processing to judge the number of barcodes in the symbol labeling map (the barcode map) of this embodiment.

FIG. 11 is a flowchart to explain one example of the processing of judging the number of 1D barcodes in the symbol labeling map (the barcode map) of this embodiment.

The number judging section 1441 implement a number judgment in the following manner. The number of elements which has a value '1', not '0', on the symbol labeling map (the barcode map) SLM is counted and set as C0 (Step ST21). At this time, it is judged whether C0 is zero or not in Step ST22. When it is judged in Step ST22 that C0 is zero, it is judged that no 1D barcode is present (Step ST28).

When it is judged in Step ST22 that C0 is not zero, the center of gravity position COG of the symbol labeling map (the barcode map) SLM acquired at the labeling unit 143 is calculated. The X-axis projection 'projX' and the Y-axis projection 'projY' of the entire area of the symbol labeling map SLM, for example, are acquired (calculated) and then the center of gravity position COG of the symbol labeling map (barcode) SLM can be acquired from the level property of the projection profiles.

Having the center of gravity position (ycog, xcog) of the symbol labeling map as the original point, the right, left, top and bottom edge positions of the symbol labeling map SLM are acquired. The left and right edge positions are detected within a horizontal extent shown in FIG. 12 as 'xstart' and 'xstop', at which the sum of the elements becomes zero (the range of calculation is 'ycog±2') using 'xcog' as the original point on the barcode map and then the detection operation is terminated. The top and bottom edge positions are detected within a vertical extent as 'yupper' and 'ylower', at which the sum of the elements becomes zero (the range of calculation is [xstart, xstop]) using 'ycog' as the original point on the barcode map and then the detection operation is terminated. Thus, four sideline positions of the 1D barcode 21 are identified on the grid coordinate system.

Also, the number of elements having any numbers but '0' within the partial area enclosed by the four sidelines in the symbol labeling map (the barcode map) is set as C1.

Figure 12:
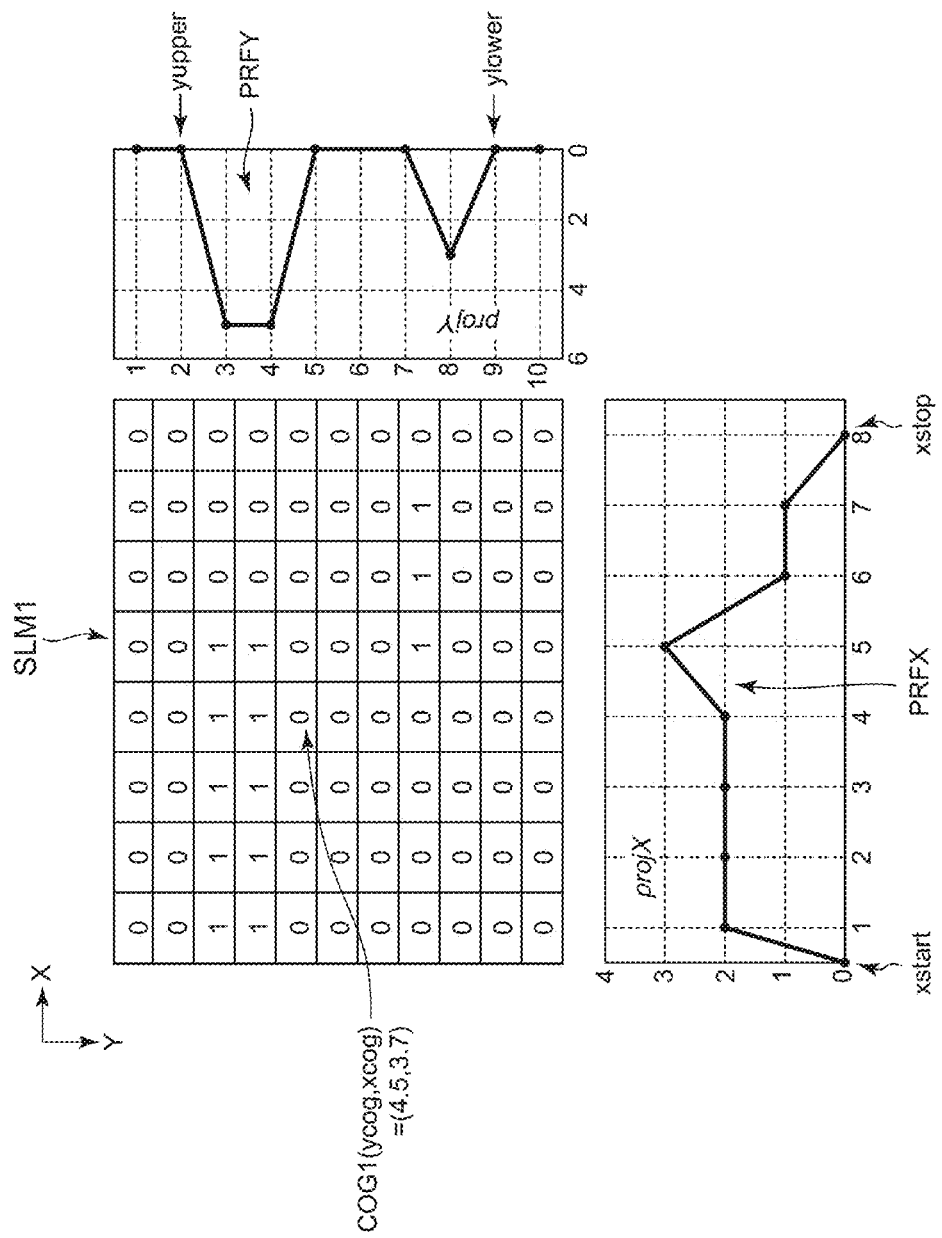
FIG. 12 Figures showing a symbol labeling map (a barcode map) when two barcodes are detected and its X-axis and Y-axis projection profiles, with the center of gravity position of the symbol labeling map and each coordinate of the left edge, the right edge, the upper edge and the lower edge.

FIG. 12 shows the symbol labeling map (a barcode map) SLM1 where two 1D barcodes are detected, the profiles PRFX and PRFY of its X-axis projection 'projX' and the Y-axis projection'projY', and the center of gravity position and each coordinate of the left, right, top, and bottom edge positions of the symbol labeling map SLM1.

The coordinates (ycog, xcog) of the center of gravity position COG1 of the symbol labeling map SLM1 are (4.5, 3.7) on the grid.

The coordinate, ycog=4.5 is acquired in the following calculation, based on the Y-axis projection 'projY':

$$ycog = \{(3 \times 5) + (4 \times 5) + (8 \times 3)\}/\{5 + 5 + 3\}$$
$$= \{15 + 20 + 24\}/\{13\} = 59/13 \approx 4.5$$

The coordinate, xcog=3.7 is acquired in the following calculation, based on the X-axis projection 'projX':

$$xcog = \{(1 \times 2) + (2 \times 2) + (3 \times 2) + (4 \times 2) + (5 \times 3) + (6 \times 1) + (7 \times 1)\}/$$
$$\{2 + 2 + 2 + 2 + 3 + 1 + 1\}$$
$$= \{2 + 4 + 6 + 8 + 15 + 6 + 7\}/\{13\}$$
$$= 48/13 \approx 3.7$$

Note that, in the symbol labeling map (the barcode) having two barcodes, the center of gravity position COG1 acquired on this map may be located at the position outside the 1D barcodes, as shown in FIG. 12.

Also note that when only one barcode is present, the center of gravity position COG2 acquired on the corresponding symbol label map (the barcode) is located at a proper position within the 1D barcode.

Next, in Step ST26, the number of elements which has a value '1' in the area enclosed by the four sides of the 1D barcode, which is acquired having the center of gravity position COG as the original point on the symbol labeling map (the barcode map) is counted and set as C1. For the symbol labeling map SLM1 in this embodiment, C1=2.

In Step ST27, it is judged whether C0 equals to C1 or not. When it is judged in Step ST27 that C0 equals to C1, it is judged that only one 1D barcode is present (Step ST29).

When it is judged in Step ST22 that C0 is not equal to C1, it is judged that two or more 1D barcodes are present (Step ST30).

The judging result from the number judging section 1441 is supplied to the division processing section 1442 where an area division processing is implemented (Step ST16 of FIG. 5).

When it is judged that two or more 1D barcodes are present, an area division is implemented at the division processing section 1442, using the corresponding symbol labeling map (the barcode map).

When two or more (multiple) 1D barcodes are present on the same image space, a position detection cannot accurately be performed. When two 1D barcodes as shown in FIG. 6, for example, are present, the corresponding symbol labeling map (the barcodes) are as shown in FIG. 10; as mentioned above, the center of gravity position COG acquired on this map is often located not inside the 1D barcode, but outside the 1D barcodes. The center of gravity position may be located inside the 1D barcode depending on the position relationship of the 1D barcodes; however, even at that time, it is difficult to accurately decode the existing barcodes. Therefore, an area division is implemented so that the areas of the 1D barcodes are divided (separated from each other) and the center of gravity position can be acquired for each area.

The area division is implemented such that the X-axis projection 'projX' and the Y-axis projection 'projY' of the entire area of the symbol labeling map SLM1 are acquired, the profiles of the acquired projections are searched for a position at which a valley portion can be recognized, the position of the valley is acquired as the boundary position (the boundary line) for the area division, and the areas R1, R2 . . . of the multiple (two in this embodiment) 1D barcodes are set based on the acquired boundary position.

Figure 13:
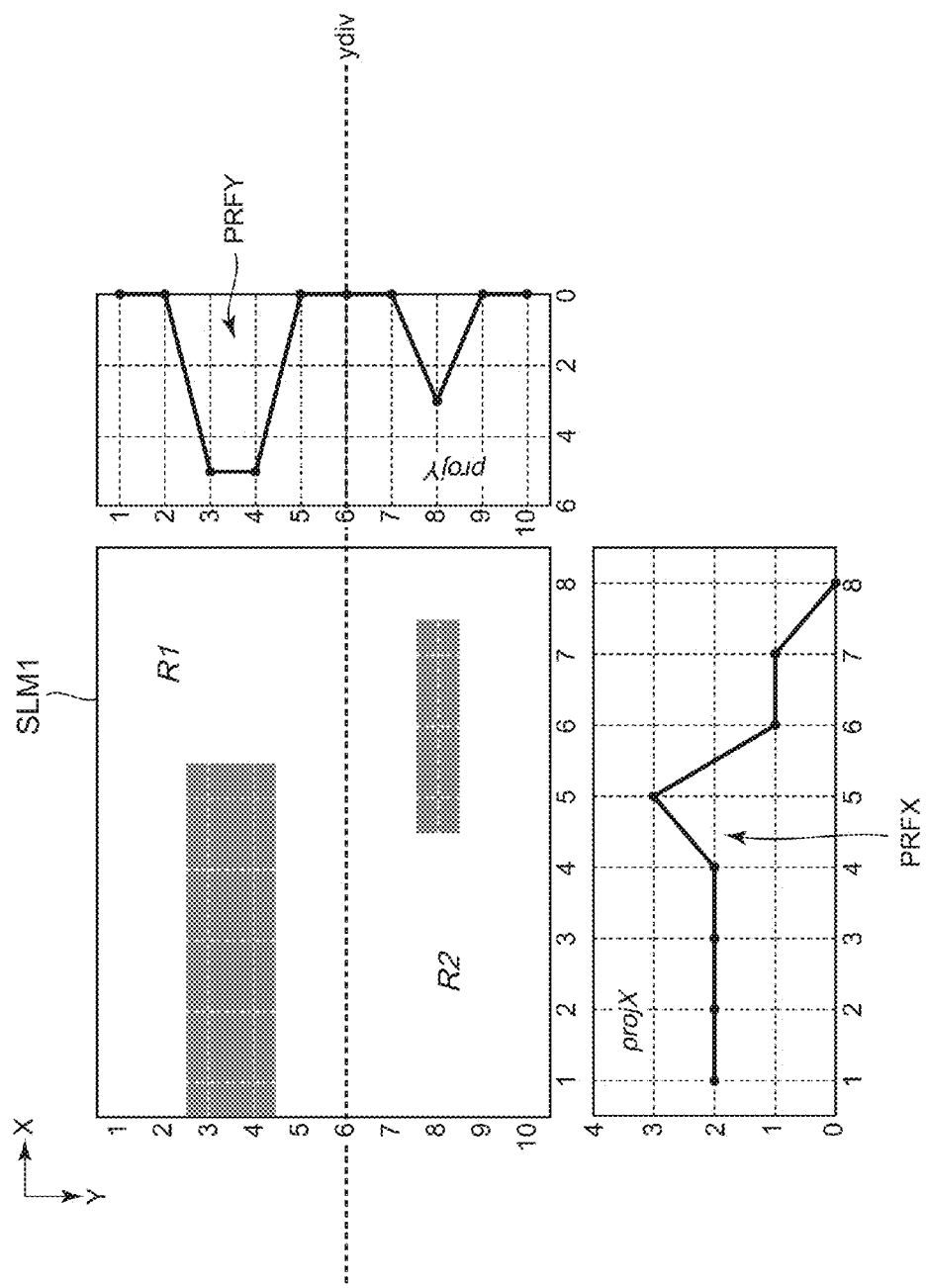
FIG. 13 Figures to explain the processing of dividing the symbol labeling map into areas when two barcodes are present.
Figure 14:
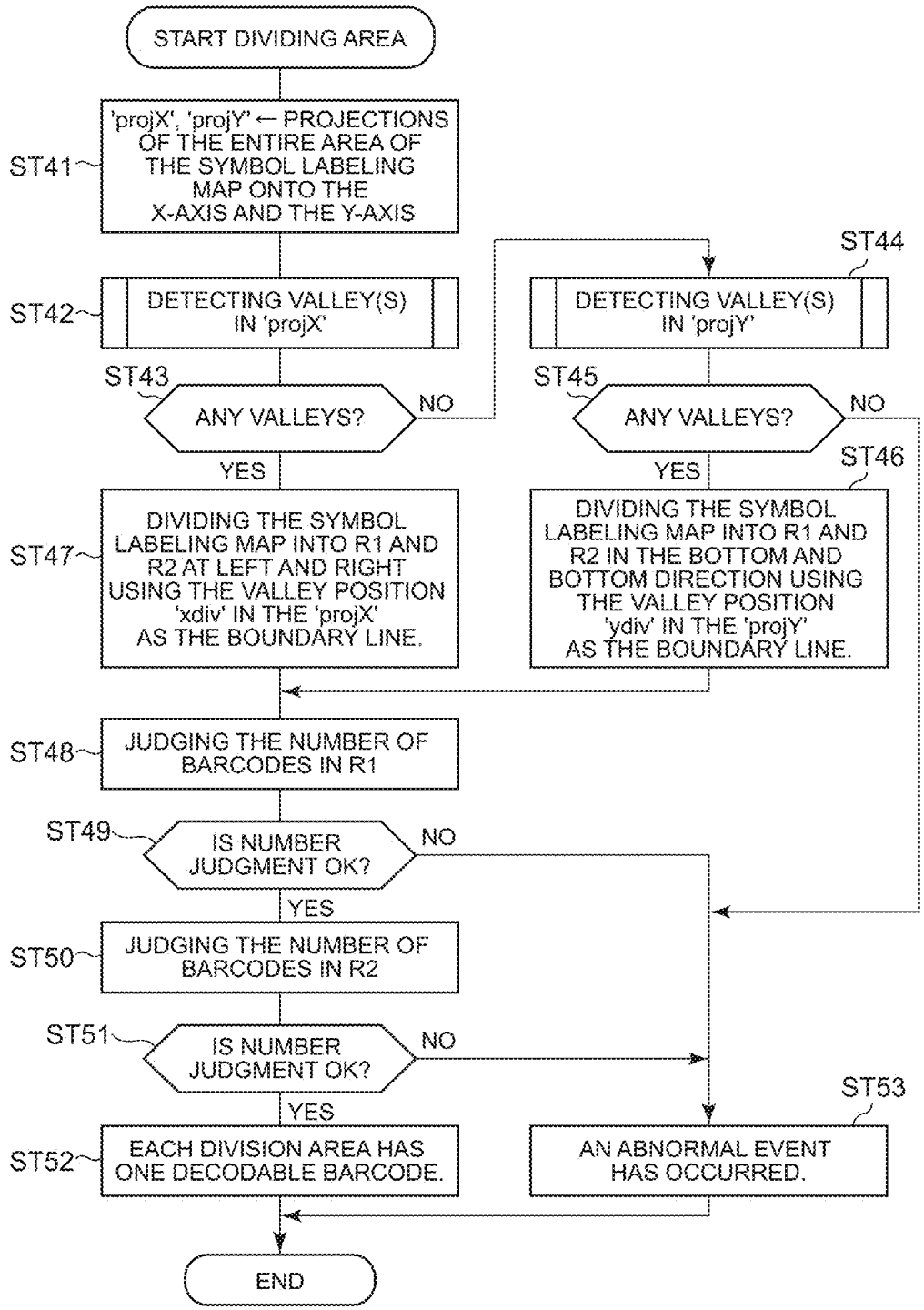
FIG. 14 A flowchart to explain the processing of dividing the symbol labeling map into areas when two barcodes are present.

FIG. 13 shows diagrams to explain the area division processing on the symbol labeling map when two 1D barcodes are present. FIG. 14 is a flowchart to explain the area division processing on the symbol labeling map when two 1D barcodes are present.

The division processing section 1442 acquires (calculates) the X-axis projection projX and the Y-axis projection projY of the entire area of the symbol labeling map (the barcode map) SLM1, or at least the X-axis projection projX or the Y-axis projection projY.

When two 1D barcodes are present, either the projection 'projX' or the projection 'projY' has, or both of them have a profile PRF (X, Y) having two peaks and one valley as long as the two barcodes are not connected. FIG. 13 shows its characteristics in the Y-axis projection 'projY'. The portion corresponding to the valley in the projection projY indicates the space between the two 1D barcodes. Therefore, by determining the position of the valley on the projection 'projY', the boundary position (the y-coordinate of the separation position) 'ydiv' of the two 1D barcodes in the up-down direction can be acquired. The two areas which are the divisions by the boundary position 'ydiv' into the top and bottom are set as R1 and R2. The same processing as for one 1D barcode is applied on each of the area R1 and R2 individually so that the position of each of the 1D barcodes can be determined.

In the processing explained in FIG. 14, the X-axis projection 'projX' and the Y-axis projection 'projY' of the entire area of the symbol labeling map (the barcode map) SLM1 are acquired (calculated) in Step ST41. Note that the X-axis projection 'projX' and the Y-axis projection 'projY' may adopt the projection information which is calculated and acquired at the aforementioned number-judgment processing.

Next, the X-axis projection 'projX' is analyzed (Step ST42) and the presence of a period of a value '0' which divides the curve into two spikes is searched (Step ST43). In the example of FIG. 13, such a period does not exist on the projection 'projX'. This is because two 1D barcodes are overlapped when viewed in the lateral direction.

Then, the Y-axis projection 'projY' is analyzed (Step sT44) and the presence of a period of a value '0' which divides the curve into two spikes is searched (Step ST45). In the example of FIG. 13, such a period exists on the projection 'projY'. The center value of the period which contains a valley in the projection curve, which has a value '0', is set as 'ydiv', and the symbol labeling map (the barcode map) is divided into two partial areas R1 and R2 at the top and bottom using 'ydiv' (Step ST46).

Note that when the X-axis projection 'projX' is analyzed (Step ST43) and there is a period with a value '0' which divides the curve into two spikes, the center value of the period which contains a valley in the projection curve, which has a value '0', is set as 'xdiv', and the symbol labeling map (the barcode map) is divided into two partial areas R1 and R2 at the top and bottom using 'xdiv' (Step ST47).

Next, the number of the 1D barcodes is judged on the partial area R1 of the symbol labeling map (the barcode map) SLM1 (Step ST48). This processing can be carried out following the aforementioned steps shown in FIG. 11. If no abnormal event exists, it can be confirmed that the number of the 1D barcodes in the area R1 is one (Step ST49).

Then, the number of the 1D barcodes is judged on the partial area R2 in the same manner (Step ST50). If no abnormal event exists, it can be confirmed that the number of the 1D barcodes in the area R2 is one (Step ST51). By the processing up to this point, it can be confirmed that each division area R1, R2 contains one decodable 1D barcode, and the positions of the 1D barcodes are determined.

Note that it will be judged that some abnormality has occurred when the presence of a valley cannot be confirmed on the projection 'projY' in Step ST45 or when it cannot be confirmed that the number of 1D barcodes in the division area R1 or R2 is one.

Next, at the position determining unit 145, a barcode position determination (a position judgment) is implemented (Step ST17 in FIG. 5). When two 1D barcodes are present and the symbol labeling ma SLM1 is divided into division areas, each position of the 1D barcodes printed on the recording medium 20 is detected, based on the divided, multiple areas labeled for the symbols of the 1D barcodes.

The position determining unit 145 calculates the center of gravity position of each of the labeled areas to determine the top, bottom, left and right edge positions of the 1D barcode. And then, based on the calculated positions, the top, bottom, left and right positions of the barcode on the image space coordinates.

The symbol position judgment processing at the position determining unit 145 starts with acquiring the center of gravity position (ycog, xcog) of the symbol labeling map. The center of gravity position is calculated based on its definition.

When two (or multiple) 1D barcodes are present and divided as individual 1D barcode at the area dividing unit 144, the X-axis projection 'projX' and the Y-axis projection 'projY' of the entire range of the symbol labeling map of each 1D barcode in the divided area are acquired, and the center of gravity position is acquired for each 1D barcode.

Figure 15:
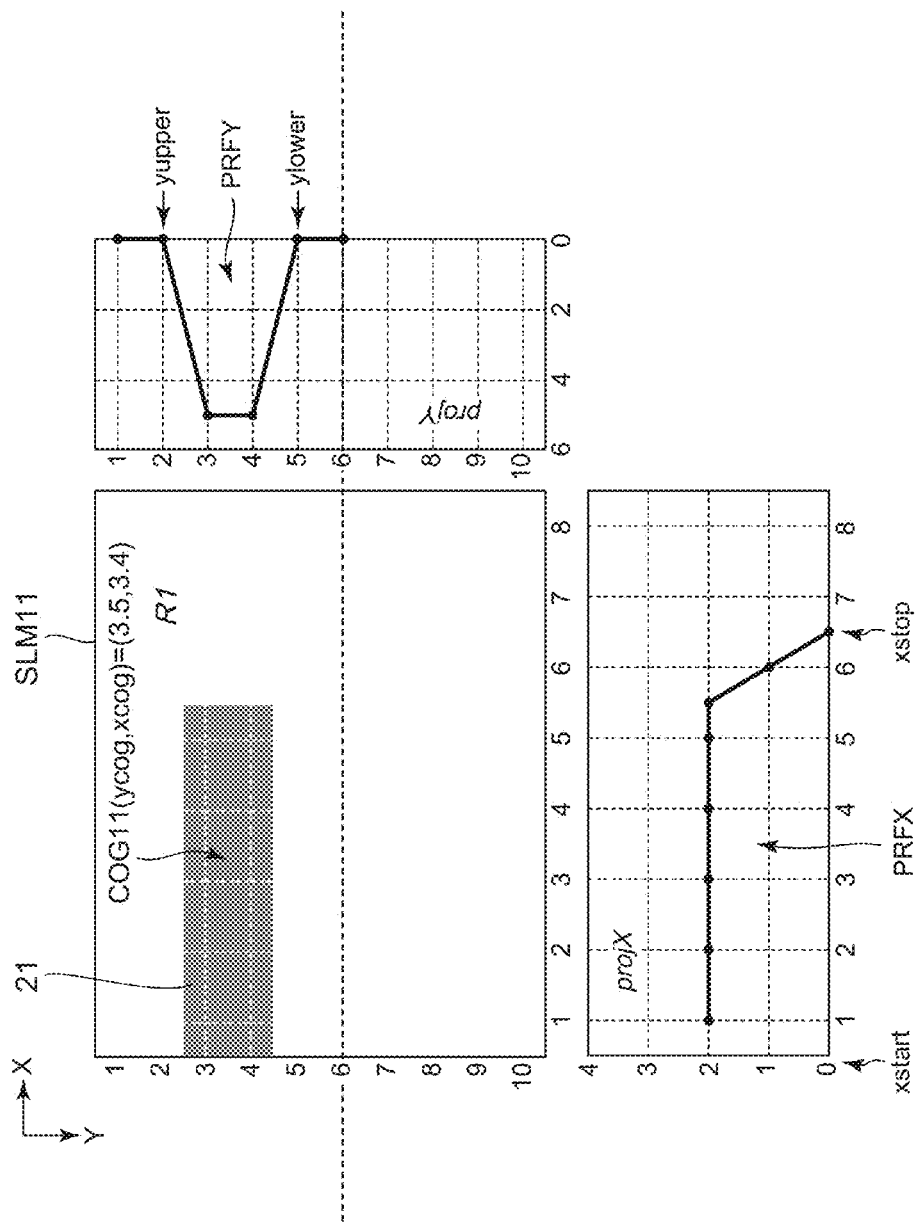
FIG. 15 Figures showing the first division area of the symbol labeling map (the barcode map) when two barcodes are detected, the profiles of the X-axis projection and the Y-axis projection, and the coordinates of the center of gravity, the left edge, the right edge, the top edge and the bottom edge positions of the symbol labeling map.

FIG. 15 shows the first division area R1 of the symbol labeling map (the barcode map) when two 1D barcodes are detected, the profiles TRFX' and TRFY' of the X-axis projection 'projX' and the Y-axis projection 'projY' of the first division area R1, and the coordinates of the center of gravity position, the left edge, the right edge, the top edge and the bottom edge of the division area.

The coordinates (ycog, xcog) of the center of gravity position COG11 of the symbol labeling map SLM11 shown in FIG. 15 are (3.5, 3.4).

The coordinate 'ycog'=3.0 is found by the following formula based on the Y-axis projection 'projY':

$$ycog = \{(3 \times 5) + (4 \times 5)\}/\{5 + 5\}$$
$$= \{15 + 20\}/\{10\} = 35/10 = 3.5$$

The coordinate 'xcog'=3.4 is found by the following formula based on the X-axis projection 'projX':

$$xcog = \{(1 \times 2) + (2 \times 2) + (3 \times 2) + (4 \times 2) + (5 \times 2) + (5.5 \times 2)\}/$$
$$\{2 + 2 + 2 + 2 + 2 + 2\}$$
$$= \{2 + 4 + 6 + 8 + 10 + 11\}/\{12\}$$
$$= 41/12 \approx 3.4$$

Since only one 1D barcode is present in the division area R1, the corresponding symbol labeling map (the barcode map) will have the center of gravity position COG11, acquired on this map, at the proper position in the 1D barcode 21.

Figure 16:
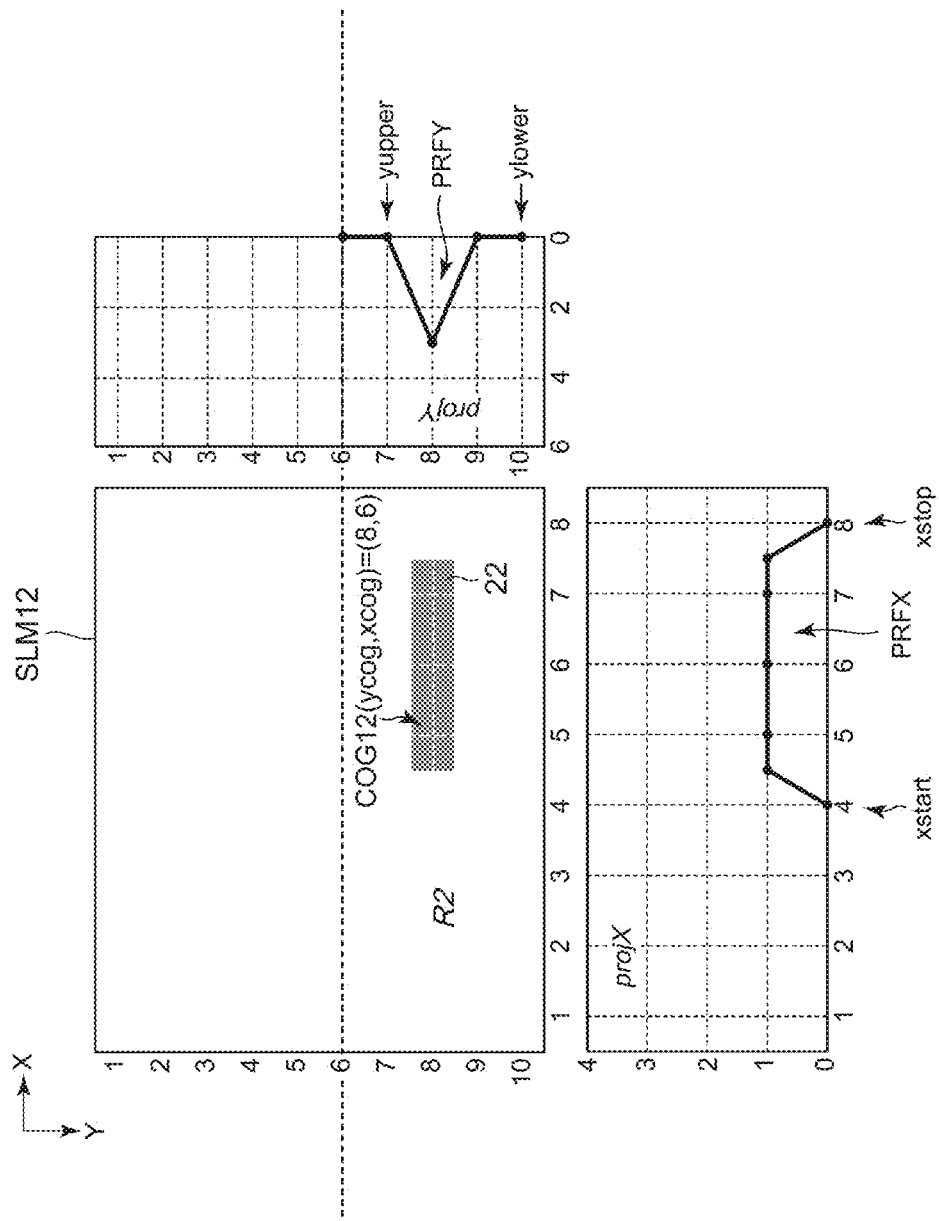
FIG. 16 Figures showing the second division area of the symbol labeling map (the barcode map) when two barcodes are detected, the profiles of the X-axis projection and the Y-axis projection, and the coordinates of the center of gravity, the left edge, the right edge, the top edge and the bottom edge positions of the symbol labeling map.

FIG. 16 shows the second division area R2 of the symbol labeling map (the barcode map) SLM1 when two 1D barcodes are detected, the profiles 'PRFX' and 'PRFY' of the X-axis projection 'projX' and the Y-axis projection 'projY' of the second division area R2, and the coordinates of the center of gravity position, the left edge, the right edge, the top edge and the bottom edge of the division area.

The coordinates (ycog, xcog) of the center of gravity position COG12 of the symbol labeling map SLM12 shown in FIG. 16 are (8, 6).

The coordinate 'ycog'=8 is found by the following formula based on the Y-axis projection 'projY':

$$ycog = \{8 \times 3\}/\{3\}$$
$$= 24/3 = 8$$

The coordinate 'xcog'=6 is found by the following formula based on the X-axis projection 'ProjX':

$$xcog = \{(4.5 \times 1) + (5 \times 1) + (6 \times 1) + (7 \times 1) + (7.5 \times 1)\}/$$
$$\{1 + 1 + 1 + 1 + 1\}$$
$$= \{4.5 + 5 + 6 + 7 + 7.5\}/\{1 + 1 + 1 + 1 + 1\}$$
$$= 30/5 = 6$$

Since only one 1D barcode is present in the division area R2, the corresponding symbol labeling map (the barcode map) will have the center of gravity position COG12, acquired on this map, at the proper position in the 1D barcode 22.

Note that when only one 1D barcode is present on the recording medium 20, the number of barcodes is determined to be one by the number judging section 1441 of the area dividing unit 144 and, without the area division processing, the center of gravity position of the entire symbol labeling map (the barcode map) is acquired at the position determining unit 145.

After acquiring the center of gravity position as described, the left edge, right edge, top edge and bottom edge of the symbol labeling map (the barcode map) are calculated. The left and right positions are calculated by detecting the coordinates 'xstare' and 'xstop' at which the sum of the elements in the X-axis direction (the range of addition is 'ycog±2') becomes zero, having the 'xcog' as the starting point on the symbol labeling map (the barcode map) and stopping at the 'xstop'. The top and bottom edges are calculated by detecting the coordinates 'yupper' and 'ylower' at which the sum of the elements in the Y-axis direction (the range of addition ['xstart', 'xstop']) becomes zero, starting on 'ycog' on the symbol labeling map (the barcode map) and stopping there. Thus, the four side positions of the 1D barcode 21, 22 are specified on the coordinates. Then, the coordinates on the image space are acquired from the coordinates of the four sides.

Each of the divided blocks has a 1-to-1 corresponding relationship with the image space; therefore, the left edge of the 1D barcode is the starting point of the block ('ycog', 'xstart'). The right edge of the 1D barcode is the ending point of the block ('ycog', 'xstop'). Therefore, the range from left to right of the 1D barcode is from the left edge to the right edge. Note that this left to right range can be extended by a predetermined number of pixels to left and right, considering the margins. The positions of the top and bottom edges of the 1D barcode on the image space can be acquired from the profile of the average luminance of the area interposed between the y coordinate of the block ('yupper', 'xcog') and the y coordinate of the block ('ylower', 'xcog').

Figure 17:
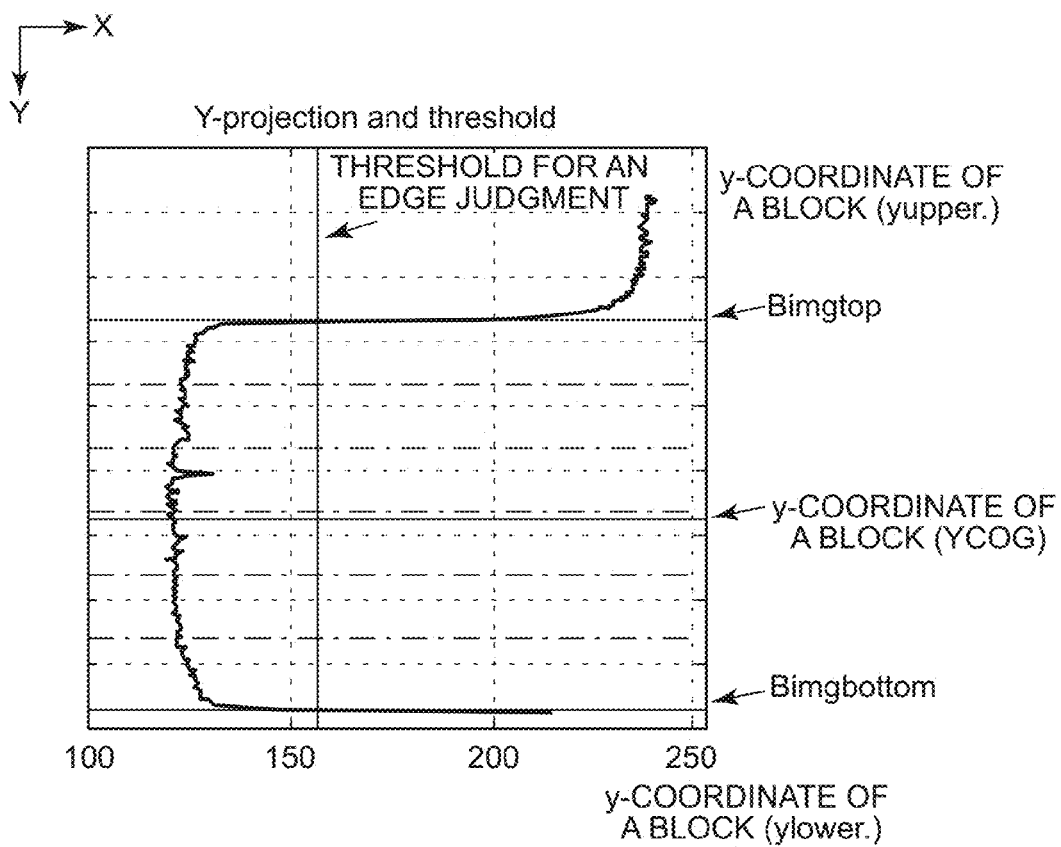
FIG. 17 A figure showing the profile of the average luminance near a barcode.

FIG. 17 shows a more concrete example.

FIG. 17 shows the profile of the average luminance near the 1D barcode 22. As shown in FIG. 17, the starting point of searching the top and bottom edges is the y-coordinate of the center of gravity block, and an edge judging threshold is determined based on the luminance value (see FIG. 17). In the search up and down [on the profile of the average luminance], the coordinates exceeding the edge judging threshold are judged as the top and bottom edges, 'Bimgtop' and 'Bimgbottom'.

Thus, the position determining unit 145 detects the positions of the 1D barcodes 21 and 22 printed on the recording medium 20, based on the labeled areas. Note that, in this embodiment, the positions of the pixels arranged in m rows and n columns, which compose the image memory, are detected. Also, for example, the position determining unit 145 may have the symbol position determining function to determine the top, bottom, left and right positions of the 1D barcode 21 printed on the recording medium 20, based on the labeled area, to count the total number of the labels in the rectangle area formed by those top, bottom, left and right positions, to judge whether or not the said total number agrees with the total number of the labels in the entire correlation map, which is counted in advance, and then to detect the positions of the 1D barcodes 21 and 22 printed on the recording medium 20. By this, the accuracy of the top, bottom, left and right positions can be increased.

Basically, in the symbol information reader, when the position of the barcode on the image space (the pixel positions) are confirmed having the edges to be 'Bimgtop' and 'Bimgbottom', the entire operation of detecting the barcode position can be ended.

In Step ST18 of FIG. 5, a scanning line for data decoding is decided.

[Major Effects of the Embodiment]

As described above, according to the barcode reading device 10 of this embodiment, the correlation map creating unit 142 in the position detecting processor 14 acquires correlations of the provisional area with the neighboring areas adjacent in the direction orthogonal to the scanning direction of the scanning line, and creates a map showing the area having high correlation values. The labeling unit 143 searches the correlation map for the presence of the 1D barcodes 21 and 22, and labels on the areas judged as having the 1D barcodes 21, 22. Next, based on the labeled areas, the area dividing unit 144 sets the area for each of the multiple 1D barcodes 21 and 22 and divides them as an individual barcode. Then, the position determining unit 145 detects the positions of the 1D barcodes 21 and 22 printed on the recording medium 20, based on the labeled area for each of the divided, multiple symbols, which are obtained at the area dividing unit 144.

Therefore, according to this embodiment, the following effects can be obtained. In this embodiment, the areas of the 1D barcodes 21 and 22 are set and divided, based on the areas labeled at the area dividing unit 144; therefore, even when two or more (multiple) symbols of the same kind, such as barcodes, are present on the single recording medium 20, the detection of the position of the 1D barcode 21, 22 printed on the recording medium 20 can be implemented on each division area. As a result, the center of gravity position of each of the 1D barcodes 21, 22 can stably be calculated, the multiple 1D barcodes 21 and 22 can be distinguished from one another, and the 1D barcodes 21 and 22 can individually be decoded.

In this embodiment, the area dividing unit 144 includes the number-judging section 1441 which judges the number of 1D barcodes present in the symbol labeling map which is labeled at the labeling unit 143, and the division processing section 1442 which sets and divides the areas of the multiple 1D barcodes 21, 22 in the symbol labeling map SLM which is judged by the number-judging unit 1441 that two or more 1D barcodes are present. According to this embodiment, the number of the 1D barcodes 21, 22 on the symbol labeling map SLM is judged prior to the division processing; therefore, when there is no 1D barcode or only one 1D barcode is present on the symbol labeling map, there is no need to implement the division processing (this operation can be omitted). As a result, the division processing can be implemented only when two or more 1D barcodes 21, 22 are present, increasing efficiency of the position detection processing.

In this embodiment, the division processing section 1442 acquires at least either the X-axis projection or the Y-axis projection of the symbol labeling map SLM at the projection acquiring section 14421. At the boundary position-acquiring section 14422, the projection profile is searched for the position at which a valley portion can be recognized, and the valley portion is acquired as a boundary position for the area division. Then, at the area-setting section 14423, an area is set for each of the multiple 1D barcodes 21, 22, based on the boundary position acquired at the boundary position-acquiring section 14422. The position determining unit 145 detects the position of the 1D barcodes 21, 22 printed on the recording medium 20, in the set areas acquired at the area setting section 14423. Thus, according to this embodiment, when implementing the division processing on the entire symbol labeling map, at least either the X-axis projection or the Y-axis projection is acquired, the acquired projection profile is searched for the position at which a valley portion can be recognized, the position of the valley portion is acquired as the boundary position for the area division, and an area is set for each of the multiple 1D barcodes 21, 22, based on the acquired boundary position; therefore, the areas which need to be divided can precisely be specified and set. Also, the boundary between the areas of the multiple 1D barcodes 21, 22 is acquired by using the projection, the amount of calculation can greatly be reduced. When the amount of calculation is reduced, the processing time can be shortened. Further, if a sufficient speed can be obtained even when an inexpensive imaging device is used, the manufacturing cost can be reduced by sparing cost spent on an expensive imaging device.

Also, in this embodiment, when the projection acquiring section 14421 acquires the X-axis projection and the Y-axis projection of the symbol labeling map SLM and the boundary position acquiring section 14422 cannot acquire the position, at which a valley portion is recognized, in the X-axis projection or the Y-axis projection, the division processing section 1442 searches the other axis projection for the position at which a valley portion can be recognized. According to this embodiment, both the X-axis projection and the Y-axis projection of the symbol labeling map SLM are acquired, and only one of the projections, the X-axis projection or the Y-axis projection is searched for the position at which a valley portion can be recognized; when the position of valley portion can be acquired, the search on the other axis projection can be omitted, increasing efficiency of the division processing.

In this embodiment, at the division processing section 1442, the projection acquiring section 14421 acquires only one of the projections, the X-axis projection or the Y-axis projection, of the entire symbol labeling map SLM; when the boundary position acquiring section 14422 cannot acquire the position at which a valley portion can be recognized, the projection acquiring section 14421 acquires the other projection, the X-axis projection or the Y-axis projection, of the entire symbol labeling map SLM, and the boundary position acquiring section 14422 searches for the position at which a valley can be recognized. Thus, according to this embodiment, only one of the projections, the X-axis projection or the Y-axis projection, of the entire symbol labeling map is acquired and the acquired projection is searched for the position at which a valley portion can be recognized; when the position of the valley portion can be acquired, the acquisition of the other axis projection and the search for the position of the valley portion can be omitted, further increasing efficiency.

In this embodiment, the area setting section 14423 is configured to confirm the number of 1D barcodes in each of the set areas. Accordingly, in this embodiment, the number of the 1D barcodes present in the division area can be confirmed, the area division can be carried out while reconfirming the result of the division processing, and if the number is different from the number which is judged previously, a judgment can be made that an abnormality has occurred.

In this embodiment, the position determining unit 145 acquires the center of gravity position of the individual division area to determine the top, bottom, left and right (in the X-axis direction and the Y-axis direction) of the 1D barcode 21, 22, and then makes a final decision on the top, bottom, left and right positions of the 1D barcode 21, 22 on the image space coordinates, based on the acquired position information. Thus, according to this embodiment, even when two or more (multiple) symbols of the same kind, such as the 1D barcodes 21, 22, are present on the recording medium 20, the position determining unit 145 can stably calculate the center of gravity position of each of the 1D barcodes 21, 22, enabling a highly precise position detection processing on the 1D barcodes 21, 22 printed on the recording medium 20.

In this embodiment, when the number of the 1D barcode on the recording medium 20 is one and the area division processing is not implemented at the area dividing unit, the position determining unit 145 detects the position of the 1D barcode printed on the recording medium 20 in the entire range of the symbol labeling map SLM. Thus, according to this embodiment, when only one or no 1D barcode is present, there is no need to judge on the necessity of the division processing and its content (omitting the process), increasing efficiency of the position detection processing.

[Other Embodiment]

Figure 18:
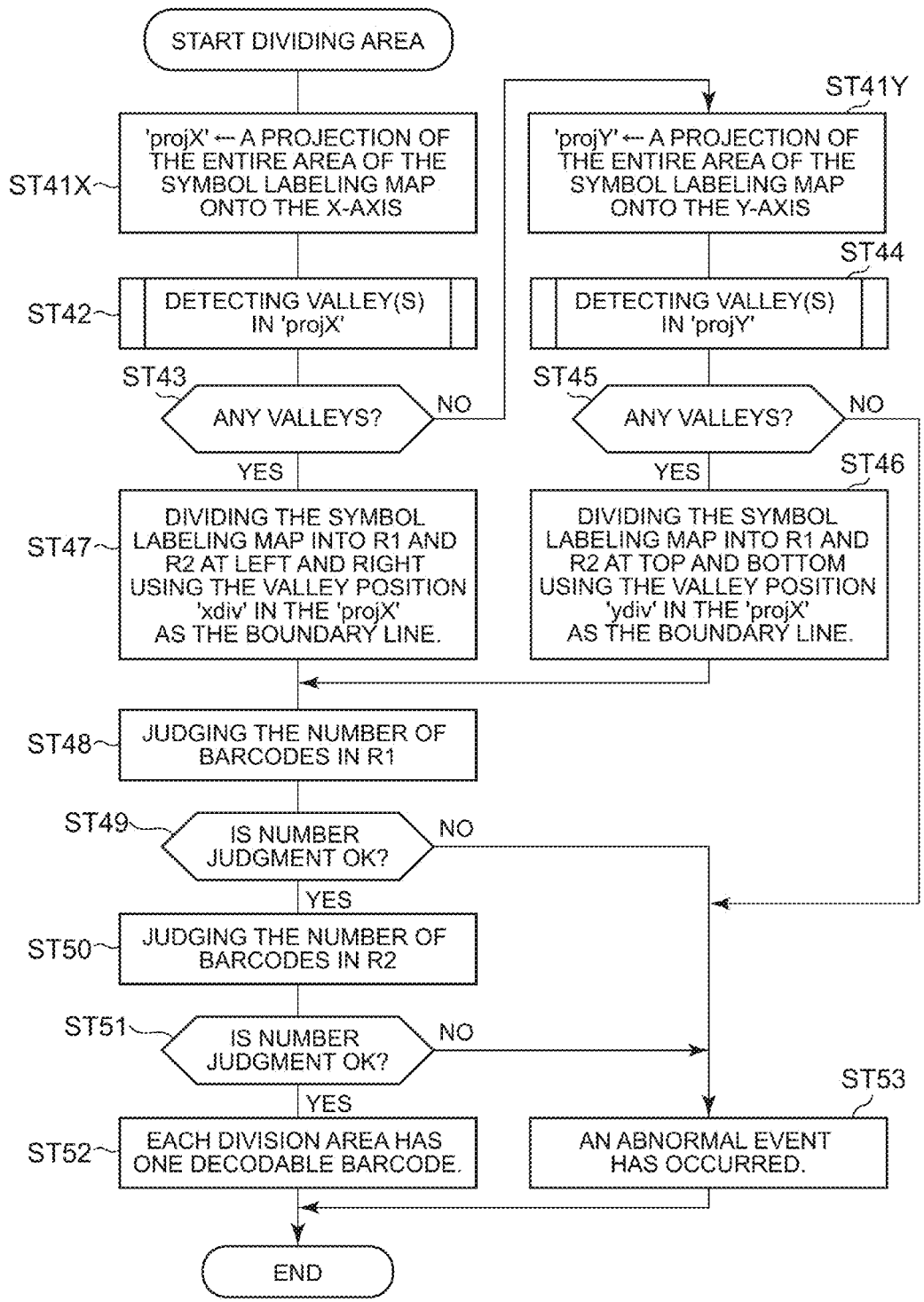
FIG. 18 A flowchart to explain other processing of dividing the symbol labeling map into areas when two barcodes are present.

This embodiment has described the processing of area division of the symbol labeling map when two 1D barcodes are present, associated with FIG. 14; however, the processing of area division of the symbol labeling map when two 1D barcodes are present can adopt the processing shown in FIG. 18.

FIG. 18 is a flowchart to explain another way of processing the area division of the symbol labeling map when two 1D barcodes 21, 22 are present.

The division processing of FIG. 18 differs from the one of FIG. 14 in the following manner. In the division processing of FIG. 14, the X-axis projection 'projX' and the Y-axis projection 'projY' of the entire the symbol labeling map are both acquired; when a position at which a valley portion can be recognized cannot be acquired in the result of the search on the X-axis projection or the Y-axis projection, the position at which a valley portion can be recognized is searched for in the projection of the other axis. On the other hand, in the division processing of FIG. 18, after acquiring only the X-axis projection 'projX' of the entire symbol labeling map (Step ST41X), if the position at which a valley portion can be recognized cannot be acquired in the X-axis projection (Step ST42, ST43), the Y-axis projection of the entire symbol labeling map (Step ST41Y) is acquired and searched for the position at which a valley portion can be identified (Step ST44, ST45). Other processing steps in FIG. 18 remain the same as those in FIG. 14.

Note that, while FIG. 14 and FIG. 18 show the processing flow when two 1D barcodes 21, 22 are present, three 1D barcodes that may be present can be processed such that a boundary line is first acquired to divide a barcode map having the three barcodes into two areas, one with one barcode and one with two barcodes, in Step 1 and another boundary line is next acquired to divide the area with two barcodes into two areas in Step 2.

Note that, although the symbol information reader of this embodiment is configured to specify multiple lines in a small block and implement a computation of the amount of change in the luminance value, which is a variance, for example, along a single line, not implementing a differential operation first and implementing a product-sum computation on the corresponding points, the amount of change in the luminance value can be acquired by calculating standard deviation in place of variance or by calculating standard deviation in place of variance along a single line.

Even in this case, the symbol information reader of this embodiment has less computation than the conventional technology.

[Example of Application]

The above embodiment is described using the processing flow for two 1D barcodes; however, even when three 1D barcodes are present, a boundary line to divide a 1D barcode into two areas, one with one barcode and one with two barcodes, is acquired in a barcode map in Step 1 and another boundary line to divide the area with two barcodes into two areas is acquired in Step 2.

At least an embodiment of the present invention may be used to detect not only a 1D barcode, but also a PDF417 or CODE128 symbol, a Code49 or other stack-type barcodes. Further, at least an embodiment of the present invention may be used for symbol information other than a barcode.

Note that the method described above in detail can be configured to be formed as a program following the above steps and be executed on a computer. Also, such a program can be accessed and executed through a recording medium such as a semiconductor memory, a magnetic disk, an optical disc, a floppy (trade mark) disk or a computer having installed such a recording medium.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A symbol information reader for use with a recording medium on which multiple symbols created in the same format are recorded, the symbol information reader comprising:
    an imaging means for imaging the recording medium;
    an image memory for saving image data of said recording medium which is acquired by said imaging means; and
    a position detecting processor for retrieving said image data and detecting the positions of said symbols on said recording medium;
    wherein said position detecting processor has
        a provisional area discriminating unit which calculates the amount of change in luminance value along the scanning direction of scanning lines of said symbols in a predetermined area of said image data and discriminates a provisional area having a possibility of corresponding to said symbol,
        a correlation map creating unit which acquires correlations of said provisional area with neighboring areas adjacent in the direction orthogonal to said scanning direction of said scanning lines and creates a map showing an area with high correlation values,
        a labeling unit which searches said correlation map for the presence of said symbols and labels on areas judged having said symbols,
        an area dividing unit which, based on said labeled areas, sets an area for each of said multiple symbols and makes divisions, and
        a position determining unit which, based on said labeled areas respectively for said multiple symbols, divided at said area dividing unit, detects positions of said symbols printed on said recording medium,
wherein said area dividing unit further includes:
a number judging section which judges the number of symbols in a symbol labeling map created at said labeling unit, and
a division processing section which sets an area for each of said multiple symbols in said symbol labeling map which is judged by said number judging unit that has two or more symbols, and divides said labeling map into the areas.

2. A symbol information reading method which is used in a symbol information reading medium comprising an imaging means for imaging a recording medium on which multiple symbols created in a same format are recorded, an image memory for saving image data of said recording medium which is acquired by said imaging means, and a position detecting processor for retrieving said image data and detecting the positions of said symbols on said recording medium, wherein said method comprises:
a first step comprising calculating the amount of change in luminance value along the scanning direction of scanning lines of said symbol in a predetermined area of said image data, and judging whether or not said predetermined area is a provisional area having a possibility of corresponding to said symbol;
a second step comprising calculating correlations of said provisional area with neighboring areas adjacent in the direction orthogonal to said scanning direction of said scanning lines and creating a map showing an area with high correlation values;
a third step comprising searching said correlation map for the presence of said symbol and the area which is judged having said symbol is labeled;
a fourth step comprising setting, based on said labeled area, areas and dividing respectively for said multiple symbols; and
a fifth step comprising detecting, based on said labeled area for each of said multiple symbols which is divided at said area dividing unit, the position of said symbol printed on said recording medium.

3. The symbol information reading method as set forth in claim 2 wherein
said fourth step further comprises:
a judging step comprising judging the number of symbols in said symbol labeling map acquired at said labeling unit, and
a division processing step comprising setting areas and dividing respectively for said multiple symbols in said symbol labeling map which is judged having two or more symbols.

4. The symbol information reading method as set forth in claim 3 wherein
said division processing step comprises:
a projection acquiring step comprising acquiring at least the X-axis projection or the Y-axis projection of the entire range of said symbol labeling map,
a boundary position acquiring step comprising searching the acquired projection profile for the position at which a valley portion can be recognized, and acquiring said position of the valley portion as a boundary position for the area division, and
an area setting step comprising setting each area for each of said multiple symbols, based on said acquired boundary position; and wherein in said fifth step, the position of each of said symbols printed on said recording medium is detected in said each area set by said area setting unit.

5. A symbol information reader for use with a recording medium on which multiple symbols created in the same format are recorded, the symbol information reader comprising:
an imager configured to image the recording medium;
an image memory configured to save image data of the recording medium which is acquired by the imager; and
a position detecting processor configured to retrieve the image data and detect the positions of the symbols on the recording medium, the position detecting processor being further configured to:
calculate the amount of change in luminance value along the scanning direction of scanning lines of the symbols in a predetermined area of the image data and discriminate a provisional area having a possibility of corresponding to the symbol,
acquire correlations of the provisional area with neighboring areas adjacent in the direction orthogonal to the scanning direction of the scanning lines and create a map showing an area with high correlation values,
search the correlation map for the presence of the symbols and label on areas judged having the symbols,
based on the labeled areas, set an area for each of the multiple symbols and makes divisions, and
based on the labeled areas respectively for the multiple symbols divided at the area dividing unit, detect positions of the symbols printed on the recording medium.

6. A symbol information reader for use with a recording medium on which multiple symbols created in the same format are recorded, the symbol information reader comprising:
an imaging means for imaging the recording medium;
an image memory for saving image data of said recording medium which is acquired by said imaging means; and
a position detecting processor for retrieving said image data and detecting the positions of said symbols on said recording medium;
wherein said position detecting processor has
a provisional area discriminating unit which calculates the amount of change in luminance value along the scanning direction of scanning lines of said symbols in a predetermined area of said image data and discriminates a provisional area having a possibility of corresponding to said symbol,
a correlation map creating unit which acquires correlations of said provisional area with neighboring areas adjacent in the direction orthogonal to said scanning direction of said scanning lines and creates a map showing an area with high correlation values,
a labeling unit which searches said correlation map for the presence of said symbols and labels on areas judged having said symbols,
an area dividing unit which, based on said labeled areas, sets an area for each of said multiple symbols and makes divisions, and
a position determining unit which, based on said labeled areas respectively for said multiple symbols, divided at said area dividing unit, detects positions of said symbols printed on said recording medium;

wherein said area dividing unit further includes:
- a number judging section which judges the number of symbols in a symbol labeling map created at said labeling unit, and
- a division processing section which sets an area for each of said multiple symbols in said symbol labeling map which is judged by said number judging unit that has two or more symbols, and divides said labeling map into the areas; and wherein said division processing section comprises:
- a projection acquiring section which acquires at least an X-axis projection or a Y-axis projection of the entire range of said symbol labeling map,
- a boundary position acquiring section which searches the profile of said projection acquired at said projection acquiring unit for the position at which a valley portion can be recognized, and acquires said position having said valley portion as a boundary position, and
- an area setting section which, based on said boundary position acquired at said boundary position acquiring unit, sets an area for each of said multiple symbols, and said position determining unit detects the position of said symbol, printed on said recording medium, in each area set at said area setting unit.

* * * * *